(12) United States Patent
December et al.

(10) Patent No.: US 11,034,857 B2
(45) Date of Patent: *Jun. 15, 2021

(54) LOW TEMPERATURE CURE COATING FORMED VIA RESIN-FACILITATED CATALYST MIGRATION BETWEEN LAYERS IN A DOUBLE LAYER CURING MECHANISM

(71) Applicant: BASF COATINGS GmbH, Muenster-Hiltrip (DE)

(72) Inventors: Timothy S. December, Rochester Hills, MI (US); Timothy Clark, Kingston (CA); Adam M. Ozvald, Kingston (CA); Donald H. Campbell, Hartland, MI (US)

(73) Assignee: BASF Coatings GmbH, Muenster (DE)

( * ) Notice: Subject to any disclaimer, the term of this patent is extended or adjusted under 35 U.S.C. 154(b) by 507 days.

This patent is subject to a terminal disclaimer.

(21) Appl. No.: 15/660,454

(22) Filed: Jul. 26, 2017

(65) Prior Publication Data

US 2019/0031910 A1     Jan. 31, 2019

(51) Int. Cl.
*C09D 175/06*     (2006.01)
*B05D 7/00*        (2006.01)
(Continued)

(52) U.S. Cl.
CPC .............. *C09D 175/06* (2013.01); *B05D 1/36* (2013.01); *C08F 220/20* (2013.01);
(Continued)

(58) Field of Classification Search
CPC .............. C09D 175/06; C09D 133/066; C09D 183/12; C09D 175/04; C09D 5/00;
(Continued)

(56) References Cited

U.S. PATENT DOCUMENTS

| 5,897,948 A * | 4/1999 | Sakon | C09D 5/08 427/189 |
| 6,780,897 B1 * | 8/2004 | Blum | B05D 3/0209 522/110 |

(Continued)

OTHER PUBLICATIONS

U.S. Appl. No. 15/220,081, filed Jul. 26, 2016, December, et al.
U.S. Appl. No. 15/220,062, filed Jul. 26, 2016, December, et al.

*Primary Examiner* — John D Freeman
(74) *Attorney, Agent, or Firm* — Armstrong Teasdale LLP

(57) ABSTRACT

A double coating, curing method, cured coating, and kit are provided. A first layer of the double coating can be a first cure coating composition, which has a first hydroxy-functional resin, a first crosslinking agent, and a first catalyst. A second layer of a second cure coating composition can have a low hydrophilicity acrylic resin as a second hydroxy-functional resin, a second crosslinking agent, and a second catalyst. The first catalyst catalyzes crosslinking between the second hydroxy-functional resin and crosslinking agent, and not between the first hydroxy-functional resin and crosslinking agent. The second catalyst catalyzes crosslinking between the first hydroxy-functional resin and crosslinking agent, and not between the second hydroxy-functional resin and crosslinking agent. The first and/or second hydroxy functional resins can facilitate catalyst migration from one layer to the other. The separate compositions can be shelf-stable and/or the curing can occur at low temperature.

15 Claims, 6 Drawing Sheets

(51) Int. Cl.
| | |
|---|---|
| *C09D 183/16* | (2006.01) |
| *B05D 1/36* | (2006.01) |
| *C09D 133/06* | (2006.01) |
| *C08J 3/24* | (2006.01) |
| *C08G 18/83* | (2006.01) |
| *C08G 18/62* | (2006.01) |
| *C08G 18/79* | (2006.01) |
| *C08F 220/20* | (2006.01) |
| *C08K 3/30* | (2006.01) |

(52) U.S. Cl.
CPC ....... *C08G 18/6254* (2013.01); *C08G 18/792* (2013.01); *C08G 18/833* (2013.01); *C08J 3/241* (2013.01); *C09D 133/066* (2013.01); *B05D 7/542* (2013.01); *B05D 7/544* (2013.01); *B05D 2202/25* (2013.01); *C08J 2433/14* (2013.01); *C08J 2475/06* (2013.01); *C08K 2003/309* (2013.01)

(58) Field of Classification Search
CPC ......... C09D 7/63; C08F 220/20; C08G 77/46; C08G 18/42; C08G 18/6254; C08G 18/792; C08G 18/833; C08J 3/241; C08J 2433/14; C08J 2475/06; B05D 1/36; B05D 2202/25; B05D 7/544; B05D 7/542; C08K 2003/309; C08L 61/32; C08L 61/28
See application file for complete search history.

(56) References Cited

U.S. PATENT DOCUMENTS

| | | | |
|---|---|---|---|
| 10,113,085 B2* | 10/2018 | December | .......... C09D 187/005 |
| 10,208,230 B2* | 2/2019 | December | .......... C08G 18/8022 |
| 2002/0014412 A1* | 2/2002 | December | ................ B05D 1/36 |
| | | | 204/484 |

* cited by examiner

LOW TEMPERATURE CURE COATING FORMED VIA RESIN-FACILITATED CATALYST MIGRATION BETWEEN LAYERS IN A DOUBLE LAYER CURING MECHANISM

THE NAMES OF THE PARTIES TO A JOINT RESEARCH AGREEMENT

A joint research agreement in the field of the invention has been entered into by BASF Corporation and GreenCentre Canada.

BACKGROUND OF THE INVENTION

Field of the Invention

A low temperature cure coating composition, a low temperature cure composite coating formed by a double layer curing mechanism, and an article comprising the low temperature cure composite coating are provided. The low temperature cure coating composition cures at temperatures from 80 to less than 120° C. in 20 minutes or less and thus is suitable for heat sensitive or plastic substrates.

Description of the Related Art Including Information Disclosed Under 37 CFR 1.97 and 1.98

In typical automotive coatings, four layers are applied to the metal surface of a vehicle: an e-coat, a primer, a basecoat, and a clearcoat. The e-coat and the primer layers are generally applied to the vehicle surface and cured. Subsequently, a basecoat formulation is applied with solvent, and the solvent is flashed off in a high temperature process. After properly conditioning the base coat, the clearcoat is applied next to provide the vehicle with a glossy finish and to protect against corrosion. Lastly, the coated vehicle surface is passed through an oven at temperatures in excess of 140° C. for 20 minutes, to cure the basecoat and clearcoat.

Although the conventional process is adequate and used commercially worldwide in the automotive industry, there is significant room for improvement. For one, any reduction in energy, materials, or the time required to make these coatings would result in large economic gains due to the large scale of use. In particular, it would be advantageous for vehicle manufacturers to reduce the number of high temperature steps as well as the process time. Additionally, it would be beneficial to reduce the temperature at which these steps are conducted.

At the same time, the automotive industry is being challenged to meet increasingly stringent Federal Corporate Average Fuel Economy (CAFE) standards for vehicle fleets. One key strategy to improve the overall fuel efficiency (mpg) of vehicles is to develop "light-weight" vehicles. A means for greatly reducing the weight of the automobile body is to replace heavier steel parts with lighter weight plastic parts. However, the use of light-weight plastics in the conventional process is an issue because many light-weight plastic substrate materials physically deform at curing temperatures greater than 130° C. Consequently, a reduction in the curing temperatures of the basecoat and the clearcoat would permit the use of plastic and other heat sensitive substrates necessary to reduce the weight of vehicle fleets.

Finally, it would be beneficial to employ at least one single-component system that is stable for an extended period of time without decomposing or prematurely curing as is typical for two-component systems in which one component contains a curable resin and the other component contains a crosslinking agent for the curable resin. Problems with two-component systems (i.e., separately packaged curable resins and crosslinking agents) include: inaccuracies arising from measuring and metering of precise amounts of each component by the preparer, which can lead to incomplete or too rapid of curing and result in undesirable film tackiness, cracking, and/or delamination; the need for costly metering equipment and metering aids to ensure the precise amounts of the separate components are mixed; under- or overmixing of the components; and the need for purge lines to avoid gelling of the individual components once they are mixed.

The objects of the present invention provided by low temperature coating compositions that are curable at temperatures from 80 to less than 120° C. with cure times of 20 minutes or less. The low temperature coating compositions include a hydroxy-functional resin, a crosslinking agent, which may be blocked, and a catalyst. Notably, the catalyst included in the low temperature cure coating compositions does not catalyze the crosslinking reaction between hydroxy-functional resin and the crosslinking agent contained therein; instead, the catalyst is configured to catalyze a crosslinking reaction between a further hydroxy-functional resin and a further crosslinking agent that are contained in a neighboring low temperature cure coating composition. Generally, the low temperature cure compositions are applied to form a low temperature cure composite coating that includes a first layer and a second layer as follows:

(1) a bottom layer of a first layer (basecoat) resin/cross-linking agent mixed with a catalyst for curing of the second layer (clearcoat); and (2) a solventborne top layer of a second layer (clearcoat) resin/cross-linking agent mixed with a catalyst for curing of the first layer (basecoat).

Once these layers are placed on a material surface, they may be simultaneously cured with a single heating operation due to a mutual migration phenomenon in which the catalyst originally contained in bottom layer migrates into the solventborne top layer and affects the curing of the solventborne top layer while the catalyst originally contained in the solventborne top layer migrates into the bottom layer and affects the curing of the bottom layer.

Particular hydroxy-functional resins in the low temperature coating compositions can especially facilitate the migration of the catalyst out of one layer and into an adjacent layer.

BRIEF SUMMARY OF THE INVENTION

The low temperature cure coating compositions of disclosed here are ideal for heat sensitive or plastic substrates because they cure at temperatures from 80 to less than 120° C.

The first and second low temperature cure coating compositions each comprise a hydroxy-functional resin, a crosslinking agent, and a catalyst that does not catalyze the crosslinking reaction between hydroxy-functional resin and the crosslinking agent contained therein. In other words, the second coating composition (a solventborne coating composition) includes a catalyst that is inactive to the crosslinking of the hydroxy-functional resin and the crosslinking agent included in the solventborne coating composition but active to crosslinking the hydroxy-functional resin and the crosslinking agent contained in a neighboring first coating composition (which can be, for example, a waterborne coating composition). The first coating composition includes a catalyst that is inactive to the crosslinking of the hydroxy-functional resin and the crosslinking agent included in the first coating composition but active to the crosslinking of the hydroxy-functional resin and the crosslinking agent contained in a neighboring solventborne second coating composition.

Inclusion of an inactive catalyst avoids premature curing and/or reaction that would accompany an active catalyst, and thus improves the shelf-stability of the low temperature cure coating compositions until the first and second coating compositions come into contact with one another and the inactive catalyst from the second coating composition diffuses into the first coating composition where it is active and affects the crosslinking of the hydroxy-functional resin and the crosslinking agent in the first coating composition, and the inactive catalyst from the first coating composition diffuses into the second coating composition where it is active and affects the crosslinking of the hydroxy-functional resin and the crosslinking agent in the second coating composition.

Moreover, the hydroxy-functional resin of one or both of the first and second coating compositions may facilitate the migration of catalyst into or out of the layer that contains the hydroxy-functional resin. Facilitation of catalyst migration may take place, for example, due to the relationship between the catalyst of the first and/or second layer and the hydroxy-functional resin of the same layer or of the other layer.

The temperature stability and shelf life of the first and second coating compositions may be improved by blocking or protecting the reactive groups of the crosslinking agent. Blocking the reactive groups of the crosslinking agent results in a higher onset curing temperature that enables the provision of single-component compositions in which the hydroxy-functional resin, the blocked crosslinking agent, and the catalyst configured to catalyze a crosslinking reaction between a different hydroxy-functional resin and crosslinking agent contained in a different low temperature cure coating composition are all contained in single-component or pre-mixed composition prior to the application of the coating composition. It should be noted, however, that if the crosslinking agents are too thermally stable, they are unable to cure in the desired temperature range from 80 to less than 120° C.

The low temperature cure composite coating of the present invention includes a first layer comprising a first low temperature cure coating composition and a second layer comprising a second low temperature cure coating composition (which is a solventborne coating composition). The first layer and the second layer are adjacent to each other, and preferably directly adjacent to each other. The first coating composition comprises a first hydroxy-functional resin, an aminoplast resin low-temperature crosslinking agent, and a first catalyst, while the second coating composition comprises a second hydroxy-functional resin (which is a low hydrophilicity acrylic resin), a second crosslinking agent, a second catalyst, and an organic solvent.

The first layer, which is generally denoted as the bottom layer or the basecoat, of the low temperature cure composite coating is formed by applying the first low temperature cure coating composition to a substrate, and the second layer, which is generally denoted as the top layer or the topcoat, is formed by applying the second low temperature cure coating composition to the first layer. Once the second layer is formed on the first layer, the first catalyst contained in the first layer migrates into the second layer and the second catalyst contained in the second layer migrates into first layer.

Unlike the first catalyst, the second catalyst catalyzes the crosslinking reaction between the first hydroxy-functional resin and the first crosslinking agent contained in the first low temperature cure coating composition. Likewise, and contrary to the second catalyst, the first catalyst catalyzes the crosslinking reaction between the second hydroxy-functional resin and the second crosslinking agent contained in the second low temperature cure coating composition. Consequently, heating the low temperature cure composite coating to a temperature from 80 to less than 120° C. cures each of the first and second low temperature cure coating compositions to form composite cured double coating. Advantageously, each of the low temperature cure coating compositions cures in 20 minutes or less.

Each of the low temperature cure coating compositions includes a hydroxy-functional resin, which may be a hydroxy-functional acrylic resin or a hydroxy-functional polyester resin. The hydroxy-functional resin of the second cure coating composition is a low hydrophilicity acrylic resin. Hydroxy-functional resins of one or both layers can serve to facilitate catalyst migration from one layer to another, for example, by the relationships between the hydroxy-functional resin(s) and the catalyst(s).

Each of the low temperature cure coating compositions includes a crosslinking agent and a catalyst. The crosslinking agents included in adjacent layers of the low temperature cure composite coatings are different, and thus, the catalysts included in directly adjacent layers are different.

A crosslinking agent in the first low-temperature cure coating composition is an aminoplast resin, which may comprise alkylol groups, which may be etherified. Melamine formaldehyde resins including methylol groups ($-CH_2OH$) and/or an alkoxymethyl groups are preferred.

The methylol and alkoxymethyl groups of the first low temperature crosslinking agent react with the hydroxyl groups of the first hydroxy-functional resin when catalyzed by an appropriate catalyst such as an acid catalyst, for example an unblocked sulfonic acid. Thus, the second catalyst is included in the second low temperature cure coating composition and excluded from the first low temperature cure coating composition. The second catalyst is only introduced into the first low temperature cure coating composition after the first and second low temperature cure coating compositions are placed in contact with each other to form the low temperature composite coating.

The second low temperature cure coating composition comprises an isocyanate (NCO) resin, which may be a blocked NCO resin, as a second low-temperature crosslinking agent. Blocking of the NCO functional groups provides resistance to hydroxyl groups of the hydroxy-functional resin at low temperatures, and thus, has a higher onset curing temperature.

Upon heating the second low temperature crosslinking agent in the presence of a catalyst, the blocking groups associated with the crosslinker (if present) will unblock themselves to free the NCO groups. Heating the second low temperature crosslinking agent in the presence of the catalyst facilitates removal of the blocking groups. Furthermore, heating of the NCO resin (or unblocked NCO resin) in the presence of a catalyst, such as a metal catalyst which can be for example an organo tin catalyst, causes the crosslinking between the hydroxyl groups of the second hydroxy-functional resin to form a urethane coating. The catalyst necessary to catalyze the reaction between the second hydroxy-functional resin and the second low temperature crosslinking agent is included in the first low temperature cure coating composition and excluded from the second low temperature cure coating composition. The metal catalyst is only introduced into the second low temperature cure coating composition after the first and second low temperature cure coating compositions are placed in contact with each other to form the low temperature composite coating.

The polymeric substrates coated with the first and second low temperature coating compositions include thermoplastic materials, such as thermoplastic polyolefins (e.g., polyethylene, polypropylene), polyamides, polyurethanes, polyesters, polycarbonates, acrylonitrile-butadiene-styrene (ABS) copolymers, EPDM rubber, acrylic polymers, vinyl polymers, copolymers and mixtures thereof. Metallic substrates, fiberglass substrates, glass substrates, and carbon fiber substrates are also suitable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
FIG. 1 shows a typical automotive coating containing the following four layers applied to the metal surface vehicle: an e-coat; a primer; a "first layer" (basecoat); and a "second layer" (clearcoat).
Figure 2:
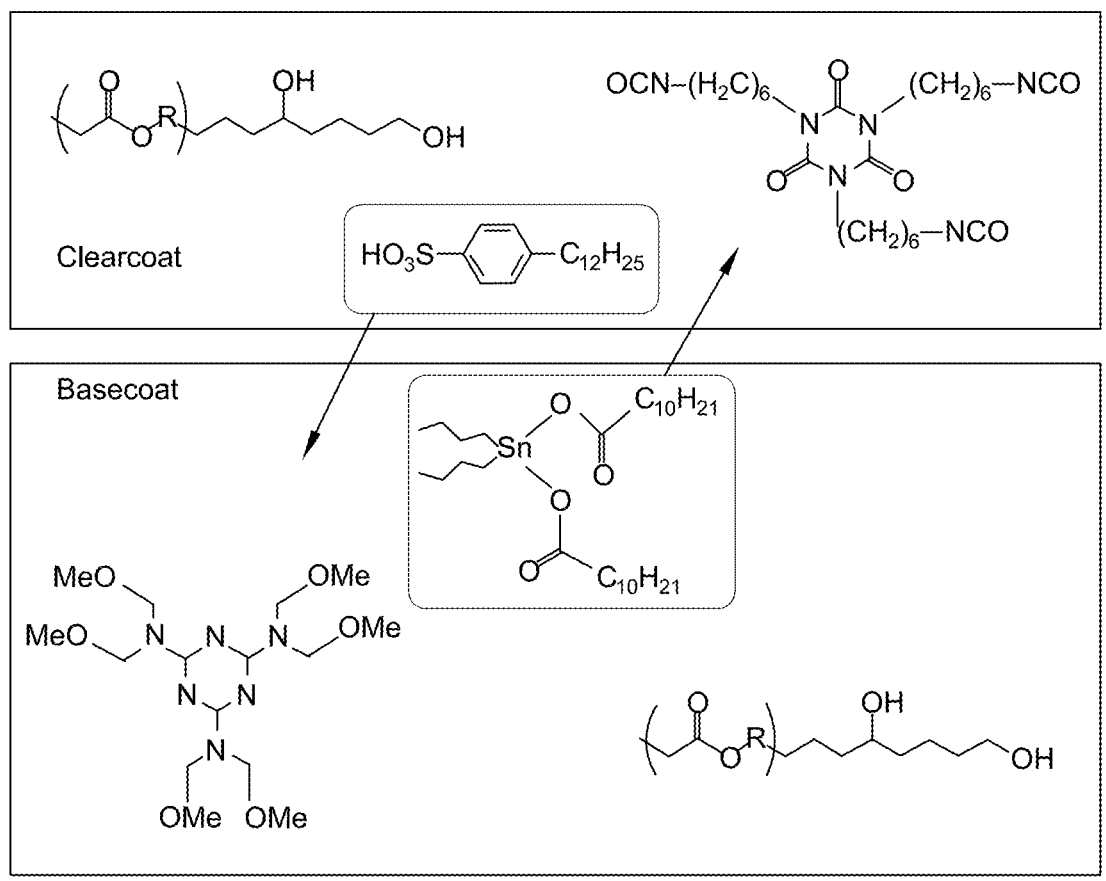
FIG. 2 shows a representation of an embodiment of the dual layer curing mechanism of the double coating in which a first catalyst—an organo tin catalyst—contained the first layer migrates into a second layer formed thereon and a second catalyst—an unblocked sulfonic acid catalyst or carboxylic acid catalyst—contained in the second layer migrates into the first layer.

Referring now to the drawings, wherein like reference numerals designate identical or corresponding parts throughout the several views.

The present invention relates to low temperature cure coating compositions, low temperature cure composite coatings that are formed by a double layer curing mechanism, and articles comprising the low temperature cure composite coatings. The low temperature cure coating compositions cure at temperatures from 80 to less than 120° C., and thus, are suitable for heat sensitive or plastic substrates. The lower temperature coating compositions also cure in 20 minutes or less.

For the purposes of the terms "low temperature cure coating composition" and "low-temperature crosslinking agent," the term "low temperature" is defined as from 80 to less than 120° C.

The term "low hydrophilicity acrylic resin" is defined as an acrylic resin with a content of oxygen and any other hetero atoms of at most 30.8% by weight.

Polymer molecular weights discussed herein are as determined by Gel Permeation Chromatography (GPC), conducted as follows: fully dissolved molecules of a polymer sample are fractionated on a porous column stationary phase. A 0.1 mol/l acetic acid solution in tetrahydrofuran (THF) is used as the eluent solvent. The stationary phase is combination of Waters Styragel HR 5, HR 4, HR 3, and HR 2 columns. Five milligrams of sample are added to 1.5 mL of eluent solvent and filtered through a 0.5 μm filter. After filtering, 100 μl of the polymer sample solution is injected into the column at a flow rate of 1.0 ml/min. Separation takes place according to the size of the polymer coils which form in the eluent solvent. Small molecules diffuse into the pores of the column material more frequently and are therefore retarded more than large molecules. Thus, large molecules are eluted earlier than small molecules. The molecular weight distribution, the averages $M_n$ and $M_w$ and the polydispersity $M_w/M_n$ of the polymer samples are calculated with the aid of chromatography software utilizing a calibration curve generated with the EasyValid validation kit, a series of unbranched-polystyrene standards of varied molecular weights available from Polymer Standards Service.

A "double coating" comprises at least two consecutive layers in contact with one another on a substrate. Within this definition of a double coating, other layers can be present between the at least two consecutive layers and the substrate. Also within this definition of a double coating, other layers can be present above the at least two consecutive layers.

Resin solids content includes both pigment (if present) and binder resin, and is as measured in accordance with ASTM test D 2369-04.

If not stated otherwise, the glass transition temperature was determined experimentally in accordance with DIN 51005 "Thermal Analysis (TA)—terms", and DIN EN ISO 11357-2 "Thermal Analysis—Dynamic Scanning calorimetry (DSC)".

First Low-Temperature Cure Coating Composition (Basecoat)

The first low temperature cure coating composition is a solventborne or waterborne composition that includes at least one hydroxy-functional resin, at least one low temperature crosslinking agent, and a first catalyst. The hydroxy-functional resin of the first low temperature cure coating composition is crosslinkable with the low temperature crosslinking agent contained therein. However, the first catalyst does not catalyze the crosslinking reaction between the hydroxy-functional resin and the low temperature crosslinking agent contained in the first low temperature cure coating composition; instead, the first catalyst functions as a catalyst to crosslink a second hydroxy-functional resin and a second low temperature crosslinking agent contained in a second low temperature cure coating composition that is disposed adjacent to and preferably in direct contact with the first low temperature cure coating composition.

The first low temperature coating composition may be a two-component system in which the first component of the system includes the hydroxy-functional resin and the first catalyst and the second component of the system includes the first low temperature crosslinking agent. Alternatively, the first component of the system may include the first hydroxy-functional resin and the second component of the system may include the first low temperature crosslinking agent and the first catalyst. Preferably the first low temperature coating composition is a single-component composition containing the first hydroxy-functional resin, the first low temperature crosslinking agent, and catalyst (i.e., a premixed composition).

The one-component low temperature coating composition of the first layer has a pot life, which is defined as the amount of time for the viscosity to double at room temperature (23° C.), of at least 30 days, preferably at least 60 days, and most preferably at least 90 days.

The one-component low temperature cure coating composition of the first layer cures within 20 minutes or less when exposed to an appropriate catalyst such as an acid catalyst. Preferably, the one-component low temperature cure coating compositions cure within 10 minutes or less. The curing of the coating composition is assessed by measuring the gel content, which is also commonly referred to as gel fraction, as it directly indicates the extent of cure resulting from the reaction, i.e., crosslinking, of the hydroxy-functional resin and low temperature crosslinking agent. The gel content of the cured first layer corresponds to the insoluble fraction after storing the first layer at room temperature under THF for 24 hours. Typically, the gel content is at least 85%, at least 95%, at least 98%, at least 99%, and even 99.9%.

The cured first layer composition has a microhardness greater than 50 N/mm$^2$, preferably greater than 90 N/mm$^2$, more preferably greater than 100 N/mm$^2$, and still more preferably greater than 120 N/mm$^2$ as determined in accordance with DIN EN ISO 14577 using the Fischerscope instrument from Fischer, with a maximum force of 25.6 mN.

First Hydroxy-Functional Resin

The first hydroxy-functional resin in the first low temperature coating composition may be any polymer having a hydroxyl functionality that is reactive with the functional groups of the first low temperature crosslinking agent contained in the first low temperature coating composition, but not with the first catalyst. Preferably, the first hydroxy-functional resin has a polarity different from the first catalyst, such that the presence of the first hydroxy-functional resin in the first layer facilitates migration of the first catalyst out of the first layer. Also preferably, the first hydroxy-functional resin has a polarity similar to the second catalyst, such that the presence of the first hydroxy-functional resin in the first layer facilitates migration of the second catalyst into the first layer.

In some embodiments, the first low-temperature cure coating composition is a solventborne coating composition.

In a solventborne first low-temperature cure coating composition, the hydroxy-functional resin is preferably at least one member selected from the group consisting of an acrylic polymer having a hydroxyl functionality and a polyester polymer having a hydroxyl functionality. Most preferably the hydroxy-functional resin is an acrylic polymer having a hydroxyl functionality. Illustrative commercially available hydroxy-functional resins include those sold under the tradename Joncryl®.

In addition to the hydroxy functional group in a solventborne composition as the first low-temperature cure coating composition, the hydroxy-functional resin may comprise a further reactive functionality so long as it is reactive with the functional groups of the first low temperature crosslinking agent contained in the first low temperature coating composition. In certain embodiments, the hydroxy-functional resin includes at least one further functionality selected from the group consisting of an amine functionality, a carboxylic acid functionality, and an epoxy functionality.

The hydroxy-functional resin present in a solventborne composition as the first low temperature coating composition may, in general, have any glass transition temperature which, in combination with the glass transition temperature of the first low temperature crosslinking agent and the equivalent weight of the hydroxy-functional resin, results in the production of a cured film having a desired hardness. Preferably the hydroxy-functional resin has a glass transition temperature of from −20° C. to 100° C., more preferably from 0° C. to 75° C., and most preferably from 10° C. to 50° C.

The hydroxy-functional resin present in a solventborne composition as the first low temperature coating composition may have a number average molecular weight (Mn), as measured by gel permeation chromatography (GPC), from 500 to 30,000, or from 600 to 20,000, or from 750 to 10,000.

The hydroxy-functional resin present in a solventborne composition as the first low temperature coating composition has a hydroxyl equivalent weight from 100 to 3,000 grams resin/eq hydroxyl, preferably from 200 to 1,500 grams resin/eq hydroxyl, and more preferably from 250 to 800 grams resin/eq hydroxyl, or even 300 to 700 grams resin/eq hydroxyl.

For the hydroxy-functional resin present in a solventborne composition as the first low temperature coating composition, suitable hydroxy-functional acrylic resins and polyester resins have sufficient hydroxyl contents for reactivity at the desired curing temperatures of 80 to 120° C., preferably 100 to 115° C., and more preferably from 100 to 110° C. or even from 100 to 105° C. The acrylic resins may have a hydroxyl number of from 15 to 565 mg KOH/g, preferably from 35 to 280 mg KOH/g, and more preferably from 70 to 225 mg KOH/g. The hydroxyl number may be less than 200 mg KOH/g, for instance less than 185 mg KOH/g, or less than 175 mg KOH/g. The hydroxy-functional acrylic resins generally have an average of at least two active hydrogen groups per molecule.

In other embodiments, the first low-temperature cure coating composition can be a waterborne composition, with an appropriate first hydroxy-functional resin contained therein. For example, a hydroxy-functional polyether-containing polyurethane is suitable as a first hydroxy-functional resin for a waterborne low temperature cure coating composition.

The polyether-containing polyurethane in a waterborne first low-temperature cure coating composition comprises, in reacted form: (i) a polyester polyol; (ii) a low molecular weight diol and/or triol; (iii) a polyether diol; and (iv) a polyisocyanate, where any free isocyanate groups are reacted with a multi-functional alcohol. Alternatively, the polyether-containing polyurethane comprises, in reacted form: (i) a polyester polyol; (ii) a low molecular weight diol and/or triol; (iii) a polyisocyanate; (iv) a trihydroxy-containing monomer; and (v) a monofunctional polyether, where any free isocyanate groups are reacted with a multi-functional alcohol. The multifunctional alcohol reacted with the isocyanate groups may be a polyol, such as ethylene glycol or trimethylol propane, or an aminoalcohol, such as ethanolamine or diethanolamine, since the amino groups of the aminoalcohol preferentially react with the isocyanate groups present to provide the polyurethane with hydroxy-functional groups.

The polyester polyol of the polyether-containing polyurethane may be branched or unbranched, and is formed from the reaction of a dicarboxylic acid and alcohol having at least two hydroxyl moieties. The carboxylic acid of the polyester polyol generally has less than 18 carbon atoms in its chain. The dicarboxylic acids may be alkyl, alkylene, aralkyl, aralkylene, and arylene. Exemplary alkyl dicarboxylic acid compounds include azeleic acid and adipic acid, a suitable aromatic dicarboxylic acid is isophthalic acid. In certain embodiments, the carboxylic acid may have more than 2 carboxy groups, for example, trimellitic anhydride.

The alcohol of the polyester polyol may be a diol, a triol, or higher alcohol-functional compounds (e.g., trimethylol propane) in the case of the branched-chain polyurethanes, the amount and type of triol-containing compounds may be varied to increase the branching effect. The diols which are usually employed in making the polyester polyol include alkylene glycols, such as ethylene glycol, propylene glycol, butylene glycol, and neopentyl glycol, 1,6 hexanediol and other glycols such as hydrogenated bisphenol A, cyclohexane dimethanol, caprolactone diol, hydroxyalkylated bisphenols, and such. Higher functional alcohols include, for example, trimethylolpropane, trimethylolethane, and pentaerythritol, as well as higher molecular weight polyols.

The low molecular weight diol and/or triol of polyether-containing polyurethane is any di- or tri-alcohol containing compound having a hydroxyl number greater than 200 (e.g., from 1500 to 2000). Aliphatic diols, particularly alkylene polyols containing from 2 to 18 carbon atoms such as ethylene glycol, propylene glycol, 1,4-butanediol, neopentyl glycol, and cycloaliphatic diols such as 1,2 cyclohexanediol and cyclohexane dimethanol, are suitable. An especially preferred diol is 1,6 hexanediol. Exemplary higher functional alcohols include trimethylol propane, trimethylolethane, and pentaerythritol.

The polyisocyanate of the polyether-containing polyurethane may be essentially any polyisocyanate containing at least two isocyanate groups, and is preferably a diisocyanate. The diisocyanate is generally selected from p-phenylene diisocyanate, biphenyl 4,4'diisocyanate, toluene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene-bis-(4 cyclohexylisocyanate). There can also be employed isocyanate-terminated adducts of diols, such as ethylene glycol, or 1,4-butylene glycol, etc. While diisocyanates are preferred, other multi-functional isocyanates such as 1,2,4-benzene triisocyanate and polymethylene polyphenyl isocyanate may be used.

The trihydroxy-containing monomers of the polyether-containing polyurethane include, for instance, polyols such as trimethylol propane, trimethylolethane, and pentaerythritol, as well as higher molecular weight polyols.

The monofunctional polyethers of the polyether-containing polyurethane are usually formed from monoalcohol initiated polymerization of ethylene oxide, propylene oxide, and mixtures thereof. A polyether compound comprised of 100% ethylene oxide units is especially preferred. Preferably, the monofunctional polyether comprises between 10 and 25% by weight of the final polyurethane resin and has a molecular weight of between 1200 and 3000.

The polyether diol of the polyether-containing polyurethane is obtained by reacting a monofunctional polyether described above with a polyisocyanate described above to produce a polyether half-capped diisocyanate, which is in turn reacted with a compound having at least one active amine hydrogen and at least two active hydroxyl groups. The obtained polyether diol has a polyether chain, a urea moiety, a urethane moiety, and two free hydroxyl groups.

Generally, the hydroxy-functional resin is present in the first low temperature cure coating composition in an amount ranging from 10 to 90 percent by weight, preferably from 35 to 65 percent by weight, and more preferably from 45 to 65 percent by weight, based on a total weight of resin solids in the composition.

First Low Temperature Crosslinking Agent

The low temperature crosslinking agent of the first low temperature cure coating composition comprises an aminoplast resin, which is reactive with the hydroxyl functionality of the first hydroxy-functional resin when catalyzed. Aminoplast resins are based on the condensation products of formaldehyde, with an amino- or amido-group carrying substance, such as melamine, urea, or benzoguanamine. In some embodiments, melamine is preferred.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol or mixtures thereof.

Melamine formaldehyde resins including either a methylol group ($—CH_2OH$), an alkoxymethyl group of general formula $—CH_2OR_1$, where $R_1$ is an alkyl chain having from 1 to 20 carbon atoms, preferably from 1 to 6 carbon atoms, more preferably from 1 to 4 carbon atoms, and combinations thereof are preferred.

The crosslinking agent of the first low temperature cure coating composition is preferably selected from hexamethylol melamine (HMM), which has the following structure:

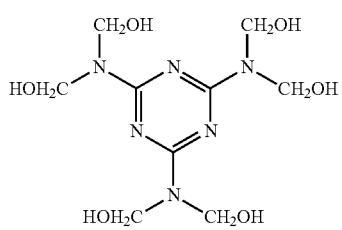

hexamethoxymethyl melamine (HMMM), which has the following structure:

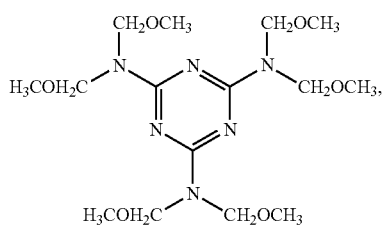

hexa(butoxymethyl) melamine (HBMM), which has the following structure:

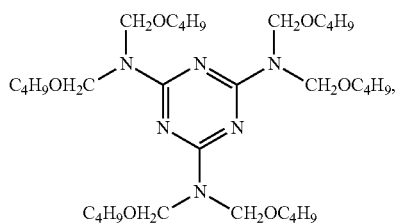

and a combination of HMMM and HBMM melamines substituted with combinations of methylol groups, methoxymethyl groups, and/or butoxymethyl groups:

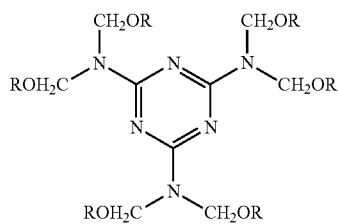

where each R is independently selected from H and $C_{1-4}$ alkyl groups, preferably $CH_3$ and $C_4H_9$, with the proviso that at least two R groups are different.

The methylol and alkoxymethyl groups of the low temperature crosslinking agent (e.g., the $CH_2OCH_3$ ether groups of HMMM) are particularly reactive with the hydroxyl groups of the hydroxy-functional resin when catalyzed by an appropriate catalyst such as an acid catalyst, for example an unblocked sulfonic acid. However, the first low temperature cure coating composition does not comprise an acid catalyst, but instead includes another catalyst such as a metal catalyst that does not catalyze a crosslinking reaction between hydroxyl groups of the hydroxy-functional resin and the low temperature crosslinking agent of the first low temperature cure coating composition.

The low temperature crosslinking agent is present in the first low temperature cure coating composition in an amount ranging from 10 to 90 percent by weight, preferably from 15 to 65 percent by weight, and more preferably from 20 to 40 percent by weight, based on a total weight of resin solids in the composition.

First Catalyst

The first catalyst included in the first low temperature cure coating composition is a catalyst that catalyzes a crosslinking reaction between the second hydroxy-functional resin and the second low-temperature crosslinking agent, and does not catalyze a crosslinking reaction between the first hydroxy-functional resin and the aminoplast resin low-temperature crosslinking agent.

In some embodiments, the first catalyst is a non-polar catalyst, while the first low-temperature cure coating composition is a polar composition. Notably, the second low-temperature cure coating composition comprises a low-hydrophilicity acrylic resin.

The first catalyst is in some embodiments an organometallic compound. The organometallic compound is optionally at least partially halogenated, which can optionally be at least partial fluorination. Preferably, the organometallic compound includes at least one non-polar moiety, more preferably two or more non-polar moieties. The at least one non-polar moiety is preferably an organic moiety. The organic moiety can optionally be at least partly halogenated, which can be, for example, at least partial fluorination. In some embodiments, the organometallic compound can comprise a silane group or a siloxane group.

The organometallic compound can be an organozirconium, organolithium, organotin, or organozinc catalyst comprising an at least partially fluorinated alkyl group. Advantageously, the organometallic compound comprises an organotin or organozinc catalyst comprising two fully fluorinated alkyl groups. The organometallic compound can also be an organobismuth catalyst comprising a trialkoxysilane group.

The organometallic compound can be a compound selected from aliphatic bismuth carboxylates such as bismuth ethylhexanoate, bismuth subsalicylate (having an empirical formula $C_7H_5O_4Bi$), bismuth hexanoate, bismuth ethylhexanoate or dimethylol-propionate, bismuth oxalate, bismuth adipate, bismuth lactate, bismuth tartarate, bismuth salicylate, bismuth glycolate, bismuth succinate, bismuth formate, bismuth acetate, bismuth acrylate, bismuth methacrylate, bismuth propionate, bismuth butyrate, bismuth octanoate, bismuth decanoate, bismuth stearate, bismuth oleate, bismuth eiconsanoate, bismuth benzoate, bismuth malate, bismuth maleate, bismuth phthalate, bismuth citrate, bismuth gluconate; bismuth acetylacetonate; bis-(triorgano tin)oxides such as bis(trimethyl tin) oxide, bis(triethyl tin) oxide, bis(tripropyl tin) oxide, bis(tributyl tin) oxide, bis (triamyl tin) oxide, bis(trihexyl tin) oxide, bis(triheptyl tin) oxide, bis(trioctyl tin) oxide, bis(tri-2-ethylhexyl tin) oxide, bis(triphelihyl tin) oxide, bis(triorgano tin)sulfides, (triorgano tin)(diorgano tin) oxides, sulfoxides, and sulfones, bis(triorgano tin)dicarboxylates such as bis(tributyl tin) adipate and maleate; bis(triorgano tin)dimercaptides, triorgano tin salts such as trioctyl tin octanoate, tributyl tin phosphate; (triorgano tin)(organo tin)oxide; trialkylalkyloxy tin oxides such as trimethylmethoxy tin oxide, dibutyl tin diacetylacetonate, dibutyl tin dilaurate, dibutyl tin bis(perfluoropentanoate); trioctyl tin oxide, tributyl tin oxide, dialkyl tin compounds such as dibutyl tin oxide, dioctyl tin oxide, dibutyl tin dilaurate, dibutyl tin diacetate, dibutyl tin dimaleate, dibutyl tin distearate, dipropyl tin dioctoate and dioctyl tin oxide; monoalkyl tin compounds such as monobutyltin trioctanoate, monobutyl tin triacetate, monobutyl tin tribenzoate, monobutyl tin trioctylate, monobutyl tin trilaurate, monobutyl tin trimyristate, monomethyl tin triformate, monomethyl tin triacetate, monomethyl tin trioctylate, monooctyl tin triacetate, monooctyl tin trioctylate, monooctyl tin trilaurate; monolauryl tin triacetate, monolauryl tin trioctylate, and monolauryl tin trilaurate; zinc octoate, zinc naphthenate, zinc tallate, zinc bis(perfluoroalkanoate), zinc carboxylates having from about 8 to 14 carbons in the carboxylate groups, zinc acetate; lithium carboxylates such as lithium acetate, lithium 2-ethylhexanoate, lithium naphthenate, lithium butyrate, lithium isobutyrate, lithium octanoate, lithium neodecanoate, lithium oleate, lithium versatate, lithium tallate, lithium oxalate, lithium adipate, lithium stearate; lithium hydroxide; zirconium alcoholates, such as methanolate, ethanolate, propanolate, isopropanolate, butanolate, tert-butanolate, isobutanolate, pentanolate, neopentanolate, hexanolate and octanolate; zirconium carboxylates such as formate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate and phenylacetate; zirconium 1,3-diketonates such as acetylacetonate (2,4-pentanedionate), 2,2,6,6-tetramethyl-3,5-heptanedionate, 1,3-diphenyl-1,3-propanedionate (dibenzoylmethanate), 1-phenyl-1,3-butananedionate and 2-acetylcyclohexanonate; zirconium oxinate; zirconium 1,3-ketoesterates, such as methyl acetoacetate, ethyl acetoacetate, ethyl-2-methyl acetoacetate, ethyl-2-ethyl acetoacetate, ethyl-2-hexylacetoacetate, ethyl-2-phenyl-acetoacetate, propyl acetoacetate, isopropyl acetoacetate, butyl acetoacetate, tert-butyl acetoacetate, ethyl-3-oxo-valerate, ethyl-3-oxo-hexanoate, and 2-oxo-cyclohexane carboxylic acid ethyl esterate; zirconium 1,3-ketoamidates, such as N,N-diethyl-3-oxo-butanamidate, N,N-dibutyl-3-oxo-butanamidate, N,N-bis-(2-ethylhexyl)-3-oxo-butanamidate, N,N-bis-(2-methoxyethyl)-3-oxo-butanamidate, N,N-dibutyl-3-oxo-heptanamidate, N,N-bis-(2-methoxyethyl)-3-oxo-heptanamidate, N,N-bis-(2-ethylhexyl)-2-oxo-cyclopentane carboxamidate, N,N-dibutyl-3-oxo-3-phenylpropanamidate, N,N-bis-(2-methoxyethyl)-3-oxo-3-phenylpropanamidate; and combinations of the foregoing metal catalysts.

Advantageously, the first catalyst is a dialkyl tin compound selected from dibutyltin oxide, dioctyl tin oxide, dibutyl tin dilaurate, dibutyl tin bis(perfluoropentanoate), dibutyl tin diacetate, dibutyl tin dimaleate, dibutyl tin distearate, dipropyl tin dioctoate, and dioctyl tin oxide. Dibutyl tin dilaurate and dibutyl tin bis(perfluoropentanoate) are preferred.

The amount of the first catalyst included in the first low temperature cure coating composition is from 0.01 to 10 percent by weight, preferably from 0.05 to 7.5 percent by weight, and more preferably from 1.0 to 5.0 percent by weight, based on the total weight of resin solids in the coating composition. As a portion of the first catalyst will migrate into a second low temperature cure coating composition discussed below, the minimum content of the first catalyst in the first low temperature cure coating composition may be 1.5 percent by weight, 2.0 percent by weight, or 2.5 percent by weight, based on the total weight of resin solids in the first low temperature cure coating composition.

In terms of a total weight of the composition solids in the first low temperature cure coating composition, the amount of the first catalyst may also range from 0.05 to 10 percent by weight, preferably from 0.25 to 7.5 percent by weight, and more preferably from 0.5 to 5.0 percent by weight. The minimum amount of the first catalyst may be increased to at least 0.75 percent by weight, at least 1.0 percent by weight, or 2.0 percent by weight, based on the total weight of resin solids in the first low temperature cure coating composition, to ensure sufficient migration of the first catalyst into the second low temperature cure coating composition.

Pigments and Colorants

The first low temperature cure coating composition may be colored with at least one pigment or colorant. Examples of suitable pigments or colorants comprise metal oxides, such as zinc oxide, antimony oxide, iron oxides, titanium dioxide, and lead oxides; carbon black; mica, including mica-based effect pigments; metallic pigments, such as aluminum flakes, bronze flakes, nickel flakes, tin flakes, silver flakes, and copper flakes; and organic pigments, such as phthalocyanines, like copper phthalocyanine blue, perylene red and maroon, quinacridone magenta and dioxazine carbazole violet.

The pigments and colorants may range up to 50 percent by weight, up to 40 percent by weight, or up to 30 percent by weight, and may be as low as 10 percent by weight, as low as 5 percent by weight, or as low as 1 percent by weight, based on a total weight of the composition solids in the first low temperature cure coating composition. In terms of the total weight of the first low temperature cure coating composition, the content of the pigment or colorant ranges from 5 to 90 percent by weight, preferably from 10 to 70 percent by weight, and more preferably from 15 to 50 percent by weight.

Liquid Component

The first low-temperature cure coating composition preferably comprises a water component and/or another suitable solvent component.

The first low-temperature cure coating composition has a total solids content of 20 percent by weight or more, preferably 25 percent by weight or more, and more preferably 30 percent by weight or more, and up to 80 percent by weight, preferably up to 75 percent by weight, and more preferably up to 60 percent by weight, based on the total weight of the first low-temperature cure coating composition. Thus, the total water or solvent content of the first low-temperature cure coating composition is at least 20 percent by weight, preferably at least 25 percent by weight, and more preferably at least 40 percent by weight and up to 80 percent by weight, preferably up to 75 percent by weight, and more preferably up to 70 percent by weight, based on the total weight of the first low-temperature cure coating composition.

Suitable solvents for the first low temperature cure coating composition include aromatic solvents, such as toluene, xylene, naphtha, and petroleum distillates; aliphatic solvents, such as heptane, octane, and hexane; ester solvents, such as butyl acetate, isobutyl acetate, butyl propionate, ethyl acetate, isopropyl acetate, butyl acetate, amyl acetate, hexyl acetate, heptyl acetate, ethyl propionate, isobutylene isobutyrate, ethylene glycol diacetate, and 2-ethoxyethyl acetate; ketone solvents, such as acetone, methyl ethyl ketone, methyl amyl ketone, and methyl isobutyl ketone; lower alcohols, such as methanol, ethanol, isopropanol, n-butanol, 2-butanol; glycol ethers such as ethylene glycol monobutyl ether, diethylene glycol butyl ether; glycol ether esters such as propylene glycol monomethyl ether acetate, ethylene glycol butyl ether acetate, 3-methoxy n-butyl acetate; lactams, such as N-methyl pyrrolidone (NMP); and mixtures thereof. In certain embodiments the solvent is VOC exempt solvent such as chlorobromomethane, 1-bromopropane, $C_{12-18}$ n-alkanes, t-butyl acetate, perchloroethylene, benzotrifluoride, p-chlorobenzotrifluoride, acetone, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane. Preferably, the solvent of the first low temperature cure coating composition is at least one selected from a lower alcohol such as butanol and an ester such as t-butyl acetate. In some embodiments, no water is included in the first low temperature coating composition.

In other embodiments, water is included in the first low temperature coating composition. If water is included, an additional solvent may be included in some embodiments, and may be absent in other embodiments. Embodiments that include water and another solvent have a content of less than 15 percent by weight of water miscible organic solvent.

Second Low-Temperature Cure Coating Composition (Topcoat)

The second low temperature cure coating composition is advantageously a solventborne composition that includes at least one low hydrophilicity acrylic resin as a second hydroxy-functional resin, at least one isocyanate resin as a second low temperature crosslinking agent, at least one acid catalyst as a second catalyst, and at least one organic solvent. The at least one isocyanate resin as a second low temperature crosslinking agent is different from the crosslinking agent included in the first low temperature cure coating composition.

Analogous to the first low temperature coating composition, the second low temperature coating composition may be in the form of a one- or two-component system. In some embodiments, the second low temperature coating composition is a two-component composition where one component contains the second hydroxy-functional resin and the other component contains the second low temperature crosslinking agent. The second catalyst may be included with the second hydroxy-functional resin or the second low temperature crosslinking agent. In other embodiments, the second low temperature coating composition is a single-component composition containing the second hydroxy-functional resin, the second low temperature crosslinking agent, and the second catalyst.

In certain embodiments, particularly but not necessarily limited to embodiments in which the second low-temperature cure coating composition is in the form of a one-component coating composition in which the free NCO groups of the crosslinking agent are blocked, the one-component coating composition has a pot life of at least 30 days, preferably at least 60 days, and most preferably at least 90 days The second low-temperature cure coating composition of the second layer cures within 20 minutes or less when exposed to the first catalyst. Preferably, the second low-temperature cure coating composition cures within 10 minutes or less. The gel content of the cured second layer corresponds to the insoluble fraction after storing the second layer at room temperature under THF for 24 hours. Typically, the gel content is at least 95%, at least 98%, at least 99%, and even 99.9%.

The cured second layer compositions have a microhardness greater than 90 N/mm$^2$, preferably greater than 100 N/mm$^2$, and more preferably greater than 120 N/mm$^2$, as determined in accordance with DIN EN ISO 14577 using the Fischerscope instrument from Fischer, with a maximum force of 25.6 mN.

Second Hydroxy-Functional Resin

The second hydroxy-functional resin is at least a low hydrophilicity acrylic resin, which preferably has a hydroxyl functionality that is reactive with the functional groups of the second low temperature crosslinking agent contained in the second low temperature coating composition, but not with the second catalyst. The low hydrophilicity of the second hydroxy-functional resin facilitates migration of the second catalyst out of the second layer. Also preferably, the low hydrophilicity of the second hydroxy-functional resin facilitates migration of the second catalyst into the first layer.

The hydrophilicity of the acrylic resin is related to the content of oxygen and any other hetero atoms in the resin. Preferably, the hetero atoms consist of oxygen, but may also include nitrogen or other hetero atoms. The hetero atom content of the low hydrophilicity acrylic resin is 30.8% by weight or less, more preferably 24.6% by weight or less, and even more preferably 21.7% by weight or less.

The hydroxy-functional resin of the second low temperature cure coating composition is crosslinkable with the low temperature crosslinking agent contained therein. However, the second catalyst does not catalyze a crosslinking reaction between the hydroxy-functional resin and the low temperature crosslinking agent contained in the second low temperature cure coating composition; instead, the second catalyst catalyzes the crosslinking of the hydroxy-functional resin and the low temperature crosslinking agent contained in the first low temperature cure coating composition that is disposed adjacent to and preferably in direct contact with the second low temperature cure coating composition.

The low hydrophilicity acrylic resin as the second hydroxy-functional resin preferably comprises, in polymerized form, at least one alkyl (meth)acrylate monomer.

The polymerized monomers can include, in some embodiments, at least one unsubstituted alkyl (meth)acrylate monomer, preferably in a content of at least 25 mol % and as high as 100 mol %. In some embodiments, the at least one unsubstituted alkyl (meth)acrylate monomer in a content of at least 30 mol %, or at least 35 mol %, or at least 40 mol %. Likewise, in some embodiments, the low hydrophilicity acrylic resin can comprise the at least one unsubstituted alkyl (meth)acrylate monomer in a content of 99 mol % or less, or 95 mol % or less, or 90 mol % or less. The alkyl group in the alkyl (meth)acrylate monomer is preferably a saturated hydrocarbon group having from 1 to 12 carbon atoms, more preferably 4 or 5 carbon atoms. The alkyl group in the alkyl (meth)acrylate monomer can be linear or branched. The alkyl (meth)acrylate monomer can include monomers that differ in having different alkyl groups with different numbers of carbon atoms and/or differences in whether they are linear or branched.

The polymerized monomers can include, in some embodiments, at least one cycloalkyl (meth)acrylate monomer, preferably in a content of at most 75 mol %. The content of the at least one cycloalkyl (meth)acrylate monomer can be at most 65 mol % or at most 55 mol %. In some embodiments, the polymerized monomers do not include a cycloalkyl (meth)acrylate monomer. The cycloalkyl (meth)acrylate monomer can be, for example, isobornyl methacrylate (IBOMA).

The polymerized monomers can include, in some embodiments, at least one (meth)acrylic acid monomer, preferably in a content of at most 25 mol %. The content of the at least one (meth)acrylic acid monomer can be at most 20 mol % or at most 10 mol %. In some embodiments, the polymerized monomers do not include a (meth)acrylic acid monomer.

The polymerized monomers can include, in some embodiments, at least one hydroxy-substituted alkyl (meth)acrylate monomer, preferably in a content of at most 75 mol %. The content of the at least one hydroxy-substituted alkyl (meth)acrylate monomer can be at most 70 mol %, or at most 60 mol %, or at most 50 mol %, or at most 25%. In some embodiments, the polymerized monomers do not include a hydroxy-substituted alkyl (meth)acrylate monomer.

These content percentages are expressed with respect to total monomers in the low hydrophilicity acrylic resin.

The polymerized monomers can include at least one other substituted alkyl (meth)acrylate monomer comprising a substituent that is not a hydroxyl group, and/or at least one other type of monomer. For example, the polymerized monomers can include at least one monomer having at least one further functionality selected from the group consisting of an amine functionality, a carboxylic acid functionality, and an epoxy functionality. In some embodiments, the monomers contain substantially no further monomers other than the substituted or unsubstituted alkyl (meth)acrylate monomers mentioned above.

The relative amounts of monomers having different hydrophobic or hydrophilic qualities in polymerized form can be adjusted in order to obtain an overall low hydrophobicity that can facilitate catalyst migration into and/or out of the second low-temperature cure coating composition, and also to adjust the other properties of the second hydroxy-functional resin and the second layer that results.

The second hydroxy-functional resin may, in general, have any glass transition temperature which, in combination with the glass transition temperature of the second low temperature crosslinking agent and the equivalent weight of the hydroxy-functional resin, results in the production of a cured film having a desired hardness. Preferably the hydroxy-functional resin has a glass transition temperature of from −20° C. to 100° C., more preferably from 0° C. to 75° C., and most preferably from 10° C. to 50° C.

The second hydroxy-functional resin may have a number average molecular weight (Mn), as measured by gel permeation chromatography (GPC), from 500 to 30,000, or from 600 to 20,000, or from 750 to 10,000.

The second hydroxy-functional resin has a hydroxyl equivalent weight from 100 to 3,000 grams resin/eq hydroxyl, preferably from 200 to 1,500 grams resin/eq hydroxyl, and more preferably from 250 to 800 grams resin/eq hydroxyl, or even 300 to 700 grams resin/eq hydroxyl.

Suitable hydroxy-functional acrylic resins and polyester resins have sufficient hydroxyl contents for reactivity at the desired curing temperatures of 80 to less than 120° C., preferably 85 to 105° C., and more preferably from 90 to 100° C. The acrylic resins may have a hydroxyl number of from 12 to 565 mg KOH/g, preferably from 15 to 565 mg KOH/g, preferably from 35 to 280 mg KOH/g, and more preferably from 70 to 225 mg KOH/g. The hydroxyl number may be less than 200 mg KOH/g, for instance less than 185 mg KOH/g, or less than 175 mg KOH/g. The hydroxy-functional acrylic resins generally have an average of at least two active hydrogen groups per molecule.

The hydroxy-functional resin is present in the solvent-borne coating composition in an amount ranging from 25 to 75 percent by weight, preferably from 35 to 65 percent by weight, and more preferably from 45 to 65 percent by weight, based on a total weight of resin solids in the composition.

Second Low-Temperature Crosslinking Agent

The second low temperature crosslinking agent present in the second low temperature cure coating composition comprises a blocked or unblocked isocyanate resin.

In some embodiments, the isocyanate resin has free NCO groups that react with the hydroxyl groups of the hydroxy-functional resin to form urethane linkages (—NH—CO—O—) and thus a crosslinked urethane.

In other embodiments, the isocyanate resin is a blocked isocyanate resin, which reacts with the hydroxyl groups of the hydroxy-functional resin when the blocking groups remove themselves (i.e., unblock) from the isocyanate resin such that free isocyanate groups remain. The free NCO functional groups of the isocyanate resin are then capable of reacting with the hydroxyl groups of the hydroxy-functional resin, to form urethane linkages (—NH—CO—O—) and thus a crosslinked urethane. Without a catalyst, the blocked isocyanate crosslinker remains blocked; even elevated temperatures only slowly unblock the isocyanate resin. As such, the blocked isocyanate resin does not readily crosslink, if at all, with the hydroxy-functional resin at temperatures from 80 to 120° C. in the absence of a metal catalyst. Nor does is the blocked isocyanate resin self-crosslink at temperatures below 120° C.

In embodiments having a blocked or an unblocked isocyanate resin, the isocyanate resin may have a number average molecular weight (Mn), as measured by gel permeation chromatography (GPC), from 100 to 30,000, from 150 to 20,000, or from 200 to 10,000, or from 250 to 5,000. The isocyanate may have an NCO equivalent weight (grams of crosslinking agent/equivalent of NCO) from 50 to 1000, preferably from 100 to 500, and more preferably from 150 to 250.

In embodiments having a blocked or an unblocked isocyanate resin, the isocyanate resin may be any organic isocyanate that is suitable for crosslinking the second hydroxy-functional resin. Preference is given to isocyanates containing from 3 to 36, in particular from 8 to about 15 carbon atoms. Examples of suitable diisocyanates include, but are not limited to, trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate (e.g. 4,4'-methylene bisdiphenyldiisocyanate), 1,5-naphthylene diisocyanate, 1,4-naphthylene diisocyanate, 1-isocyanatomethyl-3-isocyanato-3,5,5-trimethylcyclohexane (isophorone diisocyanate or IPDI), 1,3-bis(1-isocyanato-1-methylethyl) benzene (m-tetramethylxylylene diisocyanate or TMXDI), bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane. Of these, hexamethylene diisocyanate, IPDI, and TMXDI are preferred. It is also possible to use polyisocyanates of higher isocyanate functionality. Examples of these include tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl)methane, 1,3,5-tris(6-isocyanatohexyl)-1,3,5-triazinane-2,4,6-trione (i.e., hexamethylene diisocyanate cyclic trimer), 1,3,5-tris(6-isocyanatohexyl) and polymeric polyisocyanates, such as dimers and trimers of diisocyanatotoluene. It is further also possible to use mixtures of polyisocyanates. The isocyanates which come into consideration for use as the crosslinker in the invention can also be prepolymers which are derived for example from a polyol, including a polyether polyol or a polyester polyol.

In embodiments having a blocked isocyanate resin, the blocked isocyanate resin is substantially blocked, meaning that more than 90% of the NCO groups are blocked, preferably more than 95%, more than 99%, or more than 99.5% of the NCO groups are blocked. The second low temperature crosslinking agent may be completely devoid of free NCO groups. In some embodiments, the second hydroxy functional-resin should be devoid of free NCO groups and in certain embodiments the entire second low temperature cure coating composition that forms the second layer is devoid of free NCO groups.

In embodiments having a blocked isocyanate resin, blocking agents may be used individually or in combination. Suitable blocking agents include ether alcohols, alkyl alcohols, oximes, amines, amides, hydroxylamines, or any compound with active hydrogen.

Typical alkyl alcohol blocking agents are aliphatic, cycloaliphatic or aromatic alkyl monoalcohols having 1-20 carbon atoms in the alkyl group, for example, methanol, ethanol, n-propanol, butanol, pentanol, hexanol, heptanol, octanol, nonanol, 2-ethyl hexanol, 3,3,5-trimethylhexan-1-ol, cyclopentanol, cyclohexanol, cyclooctanol, phenol, pyridinol, thiophenol, cresol, phenylcarbinol, and methylphenylcarbinol.

Typical ether alcohol blocking agents are ethylene glycol mono alkyl ether, diethylene glycol mono alkyl ether, propylene glycol mono alkyl ether or dipropylene glycol mono alkyl ether with alkyl group of 1-10 carbon atoms, for example, diethylene glycol mono butyl ether, ethylene glycol butyl ether, diethylene glycol mono methyl ether, ethylene glycol methyl ether, dipropylene glycol mono methyl ether, dipropylene glycol mono butyl ether, propylene glycol mono butyl ether, propylene glycol mono methyl ether.

Typical oxime blocking agents are methyl ethyl ketone oxime, methyl isopropyl ketone oxime, methyl isobutyl ketone oxime, methyl isoamyl ketone oxime, methyl n-amyl ketone oxime, methyl 2-ethylhexyl ketone oxime, cyclobutanone oxime, cyclopentanone oxime, cyclohexanone oxime, 3-pentanone oxime, diisopropyl ketone oxime, diisobutyl ketone oxime, di-2-ethylhexyl ketone oxime, acetone oxime, formaldoxime, acetaldoxime, propionaldehyde oxime, butyraldehyde oxime, glyoxal monoxime, diacetyl monoxime.

A typical hydroxylamine blocking agent is ethanolamine. Typical amide blocking agents are caprolactam, methylacetamide, succinimide, and acetanilide. Amine blocking agents include dibutylamine and diisopropylamine.

A preferred mixture of blocking agents is glycerol and an oxime, such as cyclohexanone oxime, diisopropyl ketone oxime, or di-2-ethylhexyl ketone oxime.

The higher the temperature at which the blocking groups dissociate, the less likely that the low temperature cross-linking agent will be able to undergo the necessary cross-linking reaction in the presence of the first catalyst at 80 to less than 120° C.; however, in the absence of a sufficiently stable blocking group, the pot life of the second low temperature cure coating composition may be diminished. In such instances, the second low temperature cure coating composition can be provided as a two-component system. For one-component systems, the blocking groups of the low temperature crosslinking agent of the second low temperature do not unblock, i.e., leave or chemically dissociate, from the isocyanate resin at temperatures less than 40° C., or preferably less than 45° C., or preferably less than 50° C., or in some embodiments preferably less than 75° C. On the other hand, the blocking groups of the low temperature crosslinking agent of the second low temperature typically do unblock at temperatures less than 120° C., or preferably less than 110° C., or preferably less than 100° C., or in some embodiments preferably less than 80° C., or in some embodiments preferably less than 70° C.

Examples of blocked crosslinking agents of the second low temperature cure solventborne coating composition are represented by formulae (I)-(VIII):

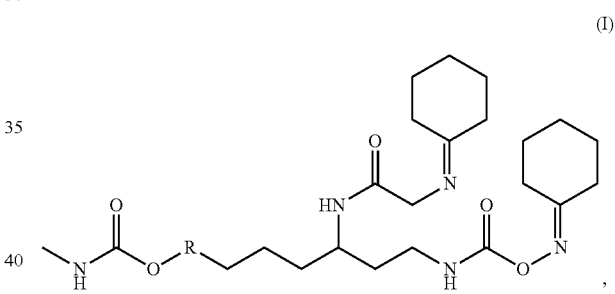

(I)

where R represents a $C_{1-20}$ alkyl group;

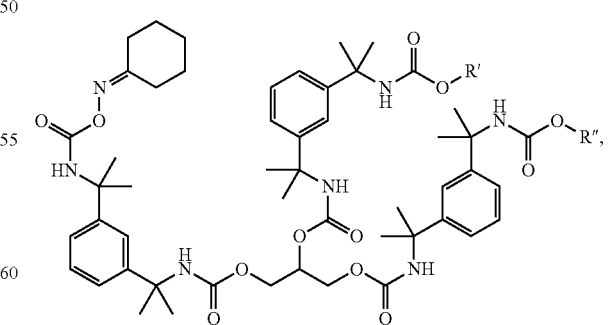

(II)

where R' and R" represent isocyanates blocked with cyclohexanone oxime, isocyanates blocked with glycerol, or oligomerized combinations of the two blocking reagents;

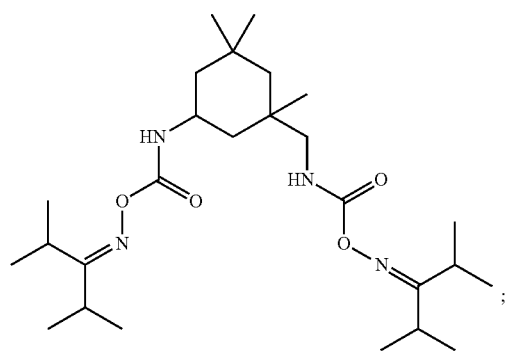
(III)
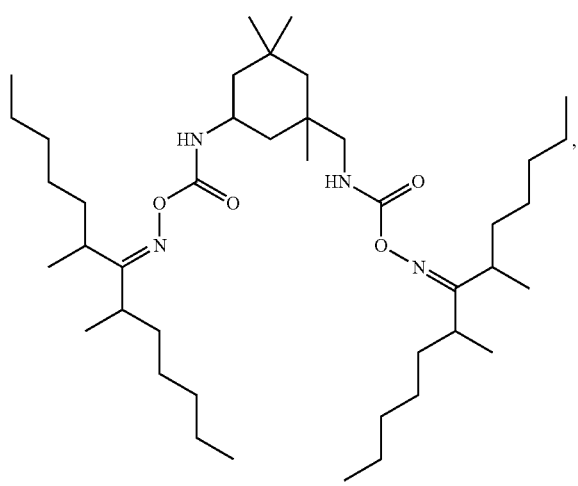
(IV)
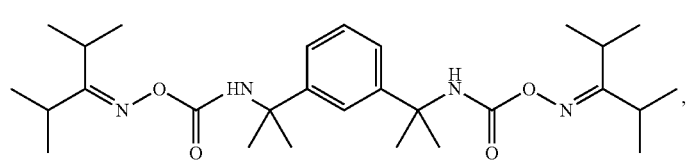
(V)
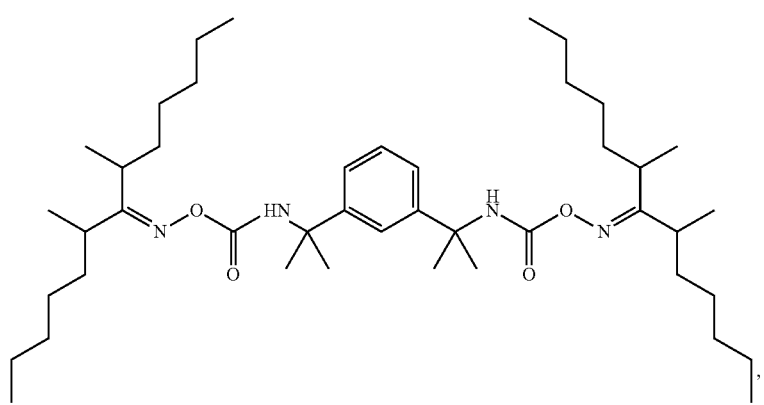
(VI)

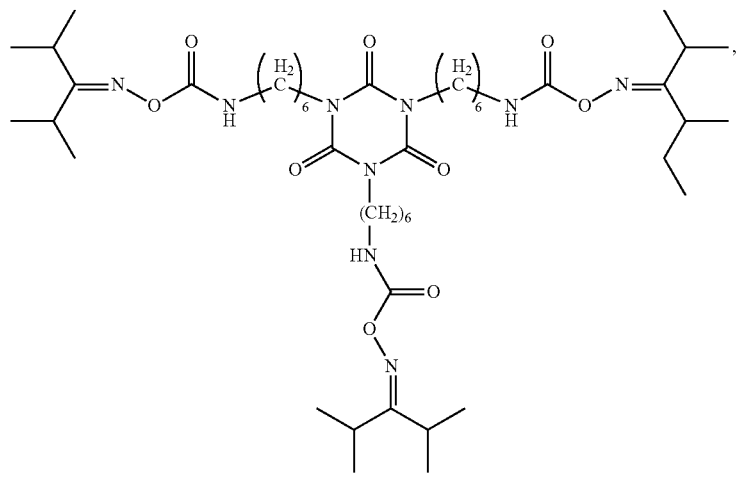

(VII)

and

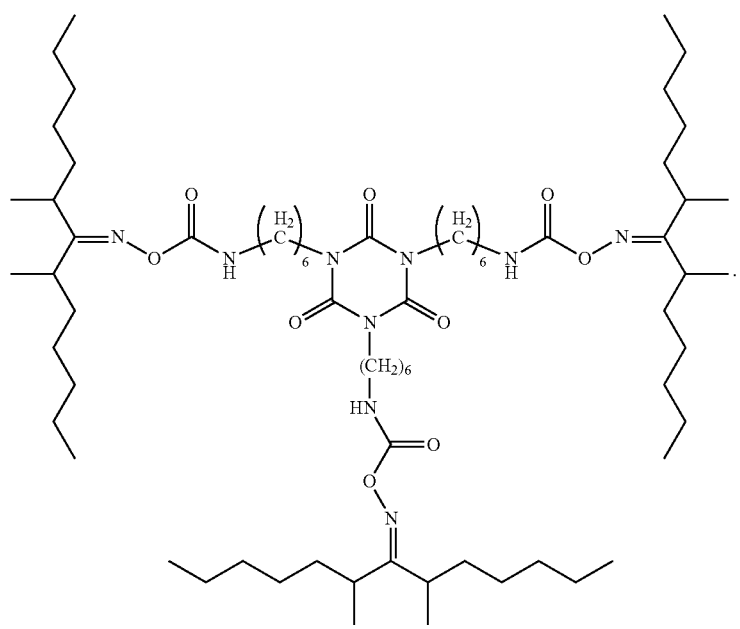

(VIII)

The low temperature crosslinking agent of formula (II) is a combination of glycerol and cyclohexanone oxime blocking agents with 1,3-bis(2-isocyanatopropan-2-yl)benzene, also known as m-tetramethylxylylene diisocyanate or TMXDI.

Oxime-blocked isocyanate (without any additional blocking agents) may be highly crystalline and have low solubility in the desired organic solvents, for example, ketone, acetate, and ester solvents. The inclusion of a second blocking agent, such as glycerol, provides the blocked isocyanate with structural irregularity, thereby decreasing the crystallinity and increasing the solubility in the ketone, acetate, and ester solvents. In certain embodiments, from 25% to 45% of the blocked functionality is from a blocking agent such as glycerol and from 55% to 75% is from an oxime blocking agent such as cyclohexanone oxime on a molar basis, preferably from 30% to 40% from the glycerol and from 60% to 70% of the oxime blocking agent.

Although the blocking groups of the blocked isocyanate resin (e.g., cyclohexanone oxime) are not reactive with the hydroxyl groups of the hydroxy-functional resin, free isocyanate groups formed by the removal of the blocking groups are. The free isocyanate groups are provided by combining the blocked isocyanate resin and a metal catalyst at elevated temperatures. Once formed, the free isocyanate groups react with the hydroxyl groups of the hydroxy-functional resin in the presence of the first catalyst to cure the second coating composition and to provide the urethane coating. As noted above, however, the second low temperature cure coating composition does not comprise a metal catalyst, but instead includes an appropriate catalyst such as an acid catalyst, for example an unblocked organic sulfonic acid. The first catalyst is incorporated into the second low temperature coating composition upon contacting the first composition with the second composition.

The low temperature crosslinking agent is present in the first low temperature cure coating composition in an amount ranging from 25 to 75 percent by weight, preferably from 35 to 65 percent by weight, and more preferably from 45 to 55 percent by weight, based on a total weight of resin solids in the composition.

Second Catalyst

The second catalyst included in the second low temperature cure coating composition may be an acid catalyst, preferably an unblocked acid catalyst and/or a carboxylic or sulfonic acid catalyst and/or a catalyst having a pKa from 0.25 to 1.0 and/or a strong acid catalyst. Preferably, the unblocked catalyst comprises an organic sulfonic acid, particularly para-toluenesulfonic acid (pTSA), methanesulfonic acid (MSA), dodecylbenzene sulfonic acid (DDBSA), dinonylnaphthalene disulfonic acid (DNNDSA), polyethylene glycol sulfonic acid, and mixtures thereof. Suitable carboxylic acid catalysts include dimethylolpropionic acid, trimethylol acetic acid, dimethyl butyric acid, dimethyl pentanoic acid, butyric acid, hexanoic acid, heptanoic acid, octanoic acid, pelargonic acid, decanoic acid, 2-ethylhexanoic acid, and lauric acid.

The acid catalyst functions to catalyze the reaction between the methylol and alkoxymethyl groups of the low temperature crosslinking agent (e.g., the $CH_2OCH_3$ ether groups of HMMM) with the hydroxyl groups of the hydroxy-functional resin contained in the first low temperature cure coating composition discussed above.

The amount of the second catalyst included in the second low temperature cure coating composition is from 0.1 to 10 percent by weight, preferably from 0.25 to 7.5 percent by weight, and more preferably from 1.0 to 5.0 percent by weight, based on the total weight of resin solids in the second low temperature cure coating composition. As a portion of the second catalyst will migrate into the first low temperature cure coating composition, the minimum content of the second catalyst in the second low temperature cure coating composition may be 1.5 percent by weight, 2.0 percent by weight, or 2.5 percent by weight, based on the total weight of resin solids in the composition.

In terms of a total weight of the composition solids in the second low temperature cure coating composition, the amount of the second catalyst may also range from 0.05 to 10 percent by weight, preferably from 0.25 to 7.5 percent by weight, and more preferably from 0.5 to 5.0 percent by weight. The minimum amount of the second catalyst may be increased to at least 0.75 percent by weight, at least 1.0 percent by weight, or 2.0 percent by weight, based on the total weight of resin solids in the composition, to ensure sufficient migration of the second catalyst into the first low temperature cure coating composition.

Pigments and Colorants

The second low temperature cure coating composition may also be colored with at least one pigment or colorant. The pigments and colorants included in the second low temperature cure coating composition are the same as those described above for the first low temperature cure coating composition.

The pigments and colorants may range up to 50 percent by weight, up to 40 percent by weight, or up to 30 percent by weight, and may be as low as 10 percent by weight, as low as 5 percent by weight, or as low as 1 percent by weight, based on a total weight of the composition solids in the second low temperature cure coating composition. In terms of the total weight of the second low temperature cure coating composition, the content of the pigment or colorant ranges from 5 to 90 percent by weight, preferably from 10 to 70 percent by weight, and more preferably from 15 to 50 percent by weight. Advantageously, the second low temperature cure coating is free of pigments and/or colorants.

Solvent

The solvents included in the second low temperature cure coating composition can be selected from among some of the same solvents as those described above for the first low temperature cure coating composition in the embodiments where such composition contains an organic solvent. The solvents in the first and second low temperature cure coating compositions may be same or different. Preferably, the solvents are different and the first and second low temperature cure coating compositions are different solvents of different polarity.

Suitable solvents for the second low temperature cure coating composition include aromatic solvents, such as toluene, xylene, naphtha, and petroleum distillates; aliphatic solvents, such as heptane, octane, and hexane; ester solvents, such as butyl acetate, isobutyl acetate, butyl propionate, ethyl acetate, isopropyl acetate, butyl acetate, amyl acetate, hexyl acetate, heptyl acetate, ethyl propionate, isobutylene isobutyrate, ethylene glycol diacetate, and 2-ethoxyethyl acetate; ketone solvents, such as acetone, methyl ethyl ketone, methyl amyl ketone, and methyl isobutyl ketone; lower alcohols, such as methanol, ethanol, isopropanol, n-butanol, 2-butanol; glycol ethers such as ethylene glycol monobutyl ether, diethylene glycol butyl ether; glycol ether esters such as propylene glycol monomethyl ether acetate, ethylene glycol butyl ether acetate, 3-methoxy n-butyl acetate; lactams, such as N-methyl pyrrolidone (NMP); and mixtures thereof. In certain embodiments the solvent is VOC exempt solvent such as chlorobromomethane, 1-bromopropane, $C_{12-18}$ n-alkanes, t-butyl acetate, perchloroethylene, benzotrifluoride, p-chlorobenzotrifluoride, acetone, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane. Preferably, the solvent of the second low temperature cure coating composition is at least one selected from a lower alcohol such as butanol and an ester such as t-butyl acetate. In other preferred embodiments, the solvents of the second low temperature coating composition are selected from mixtures of methyl isobutyl ketone, propylene glycol monomethyl ether acetate, and t-butyl acetate, mixtures of methyl isobutyl ketone and toluene, mixtures of methyl isobutyl ketone and methanol, mixtures of methyl isobutyl ketone and heptane, and mixtures of methyl isobutyl ketone and propylene glycol monomethyl ether acetate. Most preferred are mixtures containing from 40 to 60 percent by weight of toluene, from 15 to 35 percent by weight of propylene glycol monomethyl ether acetate, and from 15 to 35 percent by weight of methyl isobutyl ketone. Advantageously, no water is included in the second low temperature cure coating composition.

The second low temperature cure coating composition has a total solids content of 20 percent by weight or more, preferably 25 percent by weight or more, and more preferably 30 percent by weight or more, and up to 80 percent by weight, preferably up to 75 percent by weight, and more preferably up to 60 percent by weight, based on the total weight of the second low temperature cure coating composition. The total diluent or solvent content of the second composition ranges from at least 5 percent by weight up to 80 percent by weight, preferably at least 10 percent by weight up to 70 percent by weight, and more preferably at least 15 percent by weight up to 50 percent by weight, based on the total weight of the composition.

Additives

Each of the first and second coating compositions may also contain other additives such as surfactants, stabilizers, wetting agents, rheology control agents, dispersing agents, UV absorbers, hindered amine light stabilizers, adhesion promoters, etc. These additives may account for 0.1 to 5 percent by weight, preferably from 0.5 to 4 percent by weight, and more preferably from 0.5 to 2.5 percent by weight, based on the total weight of resin solids in the respective coating compositions.

Depositing and Curing

The first and second low temperature coating compositions are applied to a substrate to form a low temperature cure composite coating. Suitable substrates include wood, fiberglass, metal, glass, cloth, carbon fiber, and polymeric substrates.

Suitable metal substrates that can be coated include ferrous metals such as iron, steel, and alloys thereof, non-ferrous metals such as aluminum, zinc, magnesium and alloys thereof, and combinations thereof. Useful polymeric substrates include thermoplastic materials, such as thermoplastic polyolefins (e.g., polyethylene, polypropylene), polyamides, polyurethanes, polyesters, polycarbonates, acrylonitrile-butadiene-styrene (ABS) copolymers, EPDM rubber, acrylic polymers, vinyl polymers, copolymers and mixtures thereof. Thermoplastic polyolefins are preferred. Suitable substrates further include combinations of the above materials, for example, combinations of a polymeric substrate material and another type of material such as steel, galvanized steel, aluminum, or magnesium.

The low temperature cure coating compositions are particularly useful for coating polymeric substrates that are found on motor vehicles such as automobiles, trucks, and tractors. The low temperature cure coating compositions may also be applied to molded articles, toys, sporting goods, and cases or coverings for electronic devices and small appliances. The components can have any shape, but preferably are in the form of automotive body components such as bodies (frames), hoods, doors, fenders, bumpers and/or trim for automotive vehicles.

The low temperature cure composite coatings are formed by successively applying the first and second low temperature cure coating compositions to a substrate. Applying the first low temperature cure coating composition to the substrate provides a first layer. After applying the first layer, a solvent such as water or an organic solvent in the first layer may be partially or completely driven from the first layer by heating or air-drying, for instance a portion of solvent may be partially removed with an ambient flash for example at 37-60° C. that lasts for 1 to 10 minutes. The ambient flash removes enough solvent to raise the solids content of the first layer from 60 to 95 percent by weight, from 70 to 90 percent by weight, or from 75 to 85 percent by weight. Alternatively, no solvent may be removed from first layer disposed on the substrate. Any heating of the first layer should be conducted without premature crosslinking between the hydroxy-functional resin and the low temperature crosslinking agent or the self-crosslinking of these components since any crosslinking will diminish the ability of the catalysts to migrate in and out of the first layer.

After applying the first layer, which may be partially or completely dried, the second low temperature cure coating composition is applied to the first layer, to obtain a second layer. The second layer is advantageously applied directly on top of the first layer. Together, the first layer and the second layer form a low temperature cure composite coating. The second layer (topcoat) is advantageously a clearcoat. In this context, topcoat does not necessarily mean it is the outermost coat as other layers may be included on the topcoat. Likewise, the first layer is not necessarily the first coat in contact with the substrate as additional layers may be provided on the substrate under the first layer, for example, an e-coat or a primer layer.

The initially deposited first layer includes a first hydroxy-functional resin, the aminoplast crosslinking agent, and the first catalyst, while the initially deposited second layer includes a second hydroxy-functional resin, the isocyanate crosslinking agent, and the second catalyst.

After disposing the second layer on the substrate provided with the first layer such that the second layer and first layer contact each other, the first catalyst in the first layer partially migrates into the second layer and the second catalyst in the second layer partially migrates into the first layer. As a result, the low temperature cure composite coating ultimately comprises a substrate, a final first layer, and a final second layer, where the final first layer comprises the first hydroxy-functional resin, the aminoplast crosslinking agent, and the first and second catalysts, and where the final second layer comprises the second hydroxy-functional resin, the isocyanate crosslinking agent, and the first and second catalyst.

Notably, while the first hydroxy-functional resin and the aminoplast crosslinking agent are unable to self-crosslink or crosslink with each other in the presence of the first catalyst, the first hydroxy-functional resin and the aminoplast crosslinking agent are able crosslink with each other in the presence of the second catalyst that migrated into the first layer from the second layer. Likewise, although the second hydroxy-functional resin and the isocyanate crosslinking agent are unable to self-crosslink or crosslink with each other in the presence of the second catalyst, the second hydroxy-functional resin and the isocyanate crosslinking agent are able crosslink with each other in the presence of the first catalyst that migrated into the second layer from the first layer. Accordingly, heating the low temperature cure composite coatings to a temperature from 80 to less than 120° C., preferably 90 to 115° C., and more preferably from 100 to 110° C., simultaneously cures the first layer and the second layer to provide a cured doublecoating. In the curing operation, any remaining diluents are driven off and the film-forming materials of the first layer and the second layer are each crosslinked.

In some embodiments, the first hydroxy-functional resin facilitates migration of the first catalyst out of the first layer and/or facilitates migration of the second catalyst into the first layer. Likewise, in some embodiments, the second hydroxy-functional resin facilitates migration of the second catalyst out of the second layer and/or facilitates migration of the first catalyst into the second layer.

When the double coating is curing, the first layer contains at least a portion of the second catalyst that has migrated from the second layer. An amount of the second catalyst in the first layer after the curing is preferably greater than 20% by mass, more preferably greater than 30% by mass, more preferably greater than 40% by mass, and more preferably greater than 50% by mass of an initial amount of the second catalyst in the second layer immediately after the second layer is deposited. Even though the first catalyst migrates from the first layer into the second layer, the first layer inevitably retains a nonzero amount of the first catalyst, which is nonetheless lower than when the first layer was deposited on the substrate.

The first and second catalysts are each independently included in the resulting cured first layer in an amount from 0.01 to 10 percent by weight, preferably from 0.05 to 7.5 percent by weight, more preferably from 0.25 to 7.5 percent by weight, and still more preferably from 1.0 to 5.0 percent by weight, based on the total weight of resin solids in the first layer.

Since the second catalyst migrates into the first layer from the second layer, the content of the second catalyst in the first layer after curing may be less than the content of the first catalyst, for instance, by at least 0.25 percent by weight, at least 0.5 percent by weight, or at least 1 percent by weight. In other embodiments, the content of the second catalyst in the first layer after curing is greater than the content of the first catalyst in the first layer after curing.

Similarly, when the double coating is curing, the second layer contains at least a portion of the first catalyst that has migrated from the first layer. An amount of the first catalyst in the second layer after the curing is preferably greater than 20% by mass, more preferably greater than 30% by mass, more preferably greater than 40% by mass, and more preferably greater than 50% by mass of an initial amount of the first catalyst in the first layer immediately after the first layer is deposited. Even though the second catalyst migrates from the second layer into the first layer, the second layer inevitably retains a nonzero amount of the second catalyst, which is nonetheless lower than when the second layer was deposited directly on the first layer.

The first and second catalysts are also each independently included in the resulting cured second layer in an amount from 0.01 to 10 percent by weight, preferably from 0.05 to 7.5 percent by weight, and more preferably from 1.0 to 5.0 percent by weight, based on the total weight of resin solids in the second layer.

Since the first catalyst migrates into the second layer from the first layer, the content of the first catalyst in the second layer after curing may be generally less than the content of the second catalyst, for instance, by at least 0.25 percent by weight, at least 0.5 percent by weight, or at least 1 percent by weight. In other embodiments, the content of the first catalyst in the second layer after curing is greater than the content of the second catalyst in the second layer after curing.

Each of the first and second low temperature cure coating compositions are applied to the substrate in order to give dry film thicknesses from 5 to 90 µm, preferably from 7.5 to 75 µm, and more preferably from 10 to 50 µm. For instance, the dry film thickness of the first layer is from 5 to 35 µm, preferably from 10 to 30 µm, and more preferably about 20 µm, and the dry film thickness of the second layer is from 10 to 70 µm preferably from 25 to 50 µm, and more preferably about 45 µm.

The migration of the catalysts into each of the first layer and second layer may be determined by laser ablation inductively coupled plasma mass spectrometry (ICP MS) depth profiling or laser ablation complimented with ex situ X-ray photoelectron spectroscopy (XPS). The first catalyst from the first layer migrates at least 15 µm, preferably 25 µm, and more preferably entirely through the second layer. Similarly, the second catalyst from the second layer migrates at least 20 µm, preferably 30 µm, and more preferably entirely through the first layer.

In an alternative embodiment, the first layer may comprise the isocyanate crosslinking agent and the second layer may comprise the aminoplast crosslinking agent. In this case, the content of the second catalyst in the first layer could be less than the content of the first catalyst, and the content of the first catalyst in the second layer could be less than the content of the second catalyst in the resulting low temperature composite coating.

The double coating can be deposited with a kit, containing the first low-temperature cure coating composition, the second low-temperature cure coating composition, and optionally one or more other components suitable for applying or drying said compositions.

Certain embodiments of the invention are described in the following items:

Item 1: A double coating, comprising:
a substrate;
a first layer comprising a first low-temperature cure coating composition, which comprises
a first hydroxy-functional resin,
an aminoplast resin low-temperature crosslinking agent, and
a first catalyst;
and
a second layer comprising a second low-temperature cure coating composition, which is a solventborne composition comprising
as a second hydroxy-functional resin, a low hydrophilicity acrylic resin,
a second low-temperature crosslinking agent, which is an isocyanate resin,
a second catalyst, and
an organic solvent,
wherein the first layer and the second layer are adjacent to each other,
wherein the first catalyst catalyzes a crosslinking reaction between the second hydroxy-functional resin and the second low-temperature crosslinking agent, and does not catalyze a crosslinking reaction between the first hydroxy-functional resin and the aminoplast resin low-temperature crosslinking agent,
wherein the second catalyst catalyzes a crosslinking reaction between the first hydroxy-functional resin and the aminoplast resin low-temperature crosslinking agent, and does not catalyze a crosslinking reaction between the second hydroxy-functional resin and the second low-temperature crosslinking agent.

Item 2: The coating of item 1, wherein the first and second low-temperature cure coating compositions cure within 20 minutes at a temperature of 100° C.

Item 3: The coating of item 1, wherein the low hydrophilicity acrylic resin as the second hydroxy-functional resin comprises, in polymerized form, at least one alkyl (meth)acrylate monomer.

Item 4: The coating of item 1, wherein the low hydrophilicity acrylic resin as the second hydroxy-functional resin comprises, in polymerized form, at least one unsubstituted alkyl (meth)acrylate monomer in a content of at least 25 mol % with respect to total monomers in the low hydrophilicity acrylic resin.

Item 5: The coating of item 1 wherein the low hydrophilicity acrylic resin as the second hydroxy-functional resin comprises, in polymerized form, at least one cycloalkyl (meth)acrylate monomer in a content of at most 75 mol % with respect to total monomers in the low hydrophilicity acrylic resin.

Item 6: The coating of item 1, wherein the low hydrophilicity acrylic resin as the second hydroxy-functional resin comprises, in polymerized form, at least one hydroxy-substituted alkyl (meth)acrylate monomer in a content of at most 75 mol % with respect to total monomers in the low hydrophilicity acrylic resin.

Item 7: The coating of item 1, wherein the low hydrophilicity acrylic resin as the second hydroxy-functional resin comprises, in polymerized form with respect to total monomers in the low hydrophilicity acrylic resin:
at least one unsubstituted alkyl (meth)acrylate monomer in a content of from 25 mol % to 100 mol %,
optionally, a hydroxy-substituted alkyl (meth)acrylate monomer, if present, in a content of from 0 to 75 mol %,
optionally, a (meth)acrylic acid monomer, if present, in a content of from 0 to 25 mol %, and
optionally, a cycloalkyl (meth)acrylate monomer, if present, in a content of from 0 to 75 mol %.

Item 8: The coating of item 7, wherein the low hydrophilicity acrylic resin as the second hydroxy-functional resin further comprises, in polymerized form, a substituted alkyl (meth)acrylate monomer comprising a substituent that is not a hydroxyl group.

Item 9: The coating of item 1, wherein the aminoplast resin is a condensation product of formaldehyde and melamine.

Item 10: The coating of item 1, wherein the aminoplast resin is a melamine formaldehyde resin comprising methylol and/or alkoxymethyl groups of formula —$CH_2OR_1$, where $R_1$ is an alkyl chain having from 1 to 6 carbon atoms.

Item 11: The coating of item 1, wherein each of the first and second layers has a stable pot life of at least 30 days.

Item 12: The coating of item 1, wherein the second layer is a non-polar clearcoat and the first layer comprises water as the solvent.

Item 13: The coating of item 1, wherein the first low-temperature cure coating composition further comprises a pigment or colorant.

Item 14: The coating of item 1, wherein the substrate comprises, as at least one thermoplastic material, a polyolefin, a polyamide, a polyurethane, a polyester, a polycarbonate, an acrylonitrile-butadiene-styrene (ABS) copolymer, an EPDM rubber, an acrylic polymer, or a vinyl polymer.

Item 15: The coating of item 14, wherein the substrate further comprises, as at least one additional material, steel, galvanized steel, aluminum, or magnesium.

Item 16: The coating of item 1, wherein the first low-temperature cure coating composition comprises, based on a total weight of resin solids in the composition:
from 35 to 65 percent by weight of the first hydroxy-functional resin;
from 15 to 65 percent by weight of the aminoplast resin low-temperature crosslinking agent; and
from 0.05 to 7.5 percent by weight of the first catalyst.

Item 17: The coating of item 1, wherein the second low-temperature cure coating composition comprises, based on a total weight of resin solids in the composition:
from 35 to 65 percent by weight of the second hydroxy-functional resin;
from 35 to 65 percent by weight of the second low-temperature crosslinking agent; and
from 0.25 to 7.5 percent by weight of the second catalyst.

Item 18: A method of curing the coating of item 1, the method comprising curing the coating at a temperature of from 80° C. to less than 120° C.

Item 19: The method of item 18, wherein an amount of the second catalyst in the first layer after the curing is greater than 50% by mass of an initial amount of the second catalyst in the second layer immediately after the second layer is deposited.

Item 20: The method of item 19, wherein an amount of the first catalyst in the second layer after the curing is greater than 50% by mass of an initial amount of the first catalyst in the first layer immediately after the first layer is deposited.

Item 21: A method of coating a substrate by curing the double coating of item 1, the method comprising:
depositing the first layer on the substrate,
depositing the second layer directly on the first layer, thereby obtaining the double coating, and
curing the double coating at a temperature of from 80° C. to less than 120° C., thereby obtaining a cured double coating.

Item 22: The method of item 21, wherein an amount of the second catalyst in the first layer after the curing is greater than 50% by mass of an initial amount of the second catalyst in the second layer immediately after the second layer is deposited, and an amount of the first catalyst in the second layer after the curing is greater than 50% by mass of an initial amount of the first catalyst in the first layer immediately after the first layer is deposited.

Item 23: A cured double coating, obtained by the method of item 21.

Item 24: The cured double coating of item 23, wherein the first layer comprises the first catalyst in a nonzero amount that is lower than when the first layer was deposited on the substrate, and wherein the second layer comprises the second catalyst in a nonzero amount that is lower than when the second layer was deposited directly on the first layer.

Item 25: A cured double coating, comprising: a substrate; a first layer, deposited on the substrate, comprising a first hydroxy-functional resin and an aminoplast resin low-temperature crosslinking agent, in cured form; and
a second layer, deposited directly on and in contact with the first layer, comprising a hydroxy-functional low hydrophilicity acrylic resin and a second low-temperature crosslinking agent, which is an isocyanate resin, in cured form,
wherein the first layer further comprises a nonzero amount of a first catalyst, which catalyzes a crosslinking reaction between the low hydrophilicity acrylic resin and the second low-temperature crosslinking agent, and does not catalyze a crosslinking reaction between the first hydroxy-functional resin and the aminoplast resin low-temperature crosslinking agent, and
wherein the second layer further comprises a nonzero amount of a second catalyst, which catalyzes a crosslinking reaction between the first hydroxy-functional resin and the aminoplast resin low-temperature crosslinking agent, and does not catalyze a crosslinking reaction between the low hydrophilicity acrylic resin and the second low-temperature crosslinking agent.

Item 26: A kit, comprising:
as a first component, a first low-temperature cure coating composition, which comprises:
  a first hydroxy-functional resin,
  an aminoplast resin low-temperature crosslinking agent, and
  a first catalyst,
and
as a second component, a second low-temperature cure coating composition, which is a solventborne composition comprising:
  as a second hydroxy-functional resin, a low hydrophilicity acrylic resin,
  a second low-temperature crosslinking agent, which is an optionally-blocked isocyanate resin,
  a second catalyst, and
  an organic solvent,
wherein the first catalyst catalyzes a crosslinking reaction between the second hydroxy-functional resin and the second low-temperature crosslinking agent, and does not catalyze a crosslinking reaction between the first hydroxy-functional resin and the aminoplast resin low-temperature crosslinking agent,
wherein the second catalyst catalyzes a crosslinking reaction between the first hydroxy-functional resin and the aminoplast resin low-temperature crosslinking agent, and does not catalyze a crosslinking reaction between the second hydroxy-functional resin and the second low-temperature crosslinking agent.

The invention is further described in the following examples, which are merely illustrative and do not limit the scope of the invention as described.

EXAMPLES

Example 1

A waterborne first layer formulation was prepared by mixing 469.5 grams of an aqueous polyester-polyurethane resin (192.5 grams of solids), 86.8 grams of hexa(methoxymethyl)melamine (Resimene® 747, 82.5 grams of solids), 11.0 grams of 2,4,7,9-tetramethyldec-5-yne-4,7-diol (TMDD), 55.0 grams of ethylene glycol monobutyl ether, and 115.9 grams of deionized water with a mixture containing 27.5 grams of a polypropylene glycol (Pluracol® P1010, 27.5 grams solids), 68.8 grams of ethylene glycol monobutyl ether, and 27.5 grams of dibutyltin dilaurate (DBTDL, 27.5 grams solids). Next, 159.1 grams of deionized water were added to reduce the viscosity of the first layer composition to 70 cps at 25° C.

A low hydrophilicity acrylic resin was prepared containing, in polymerized form, 2.00 parts by weight (3.96 mol %) glacial methacrylic acid, 34.00 parts by weight (25.66 mol %) isodecyl methacrylate, 25.00 parts by weight (19.20 mol %) isobornyl methacrylate, and 39.00 parts by weight (51.18 mol %) 2-hydroxyethyl methacrylate. This resin therefore had a content of heteroatoms (consisting of oxygen atoms) of 24.6% by weight.

A two component solventborne second layer formulation was prepared by mixing 382.4 grams of the low hydrophilicity acrylic resin described immediately above (260.0 grams of solids), 0.8 grams of a solution of a polyether modified polymethylalkylsiloxane (BYK-325), 40.0 grains of ethylene glycol monobutyl ether acetate, 280 grams of n-amylacetate, and 40 grams of 4-dodecylbenzenesulfonic acid (DDBSA, NAXCAT® 1270, 70 wt % solution), to prepare the first component. The second component was prepared by mixing 140 grams of an aliphatic polyisocyanate (Desmodur® N3300 HDI trimer) 27.2 grams of n-butylacetate, and 27.2 grams of naphtha. The first and second components were mixed prior to being applied to form the solventborne second layer.

A low temperature cure composite coating was prepared by: depositing the waterborne first layer composition on an aluminum substrate; drying the first layer for 10 minutes at 43.3° C.; and depositing, on the partially dried first layer, the solventborne second layer composition.

Figure 3:
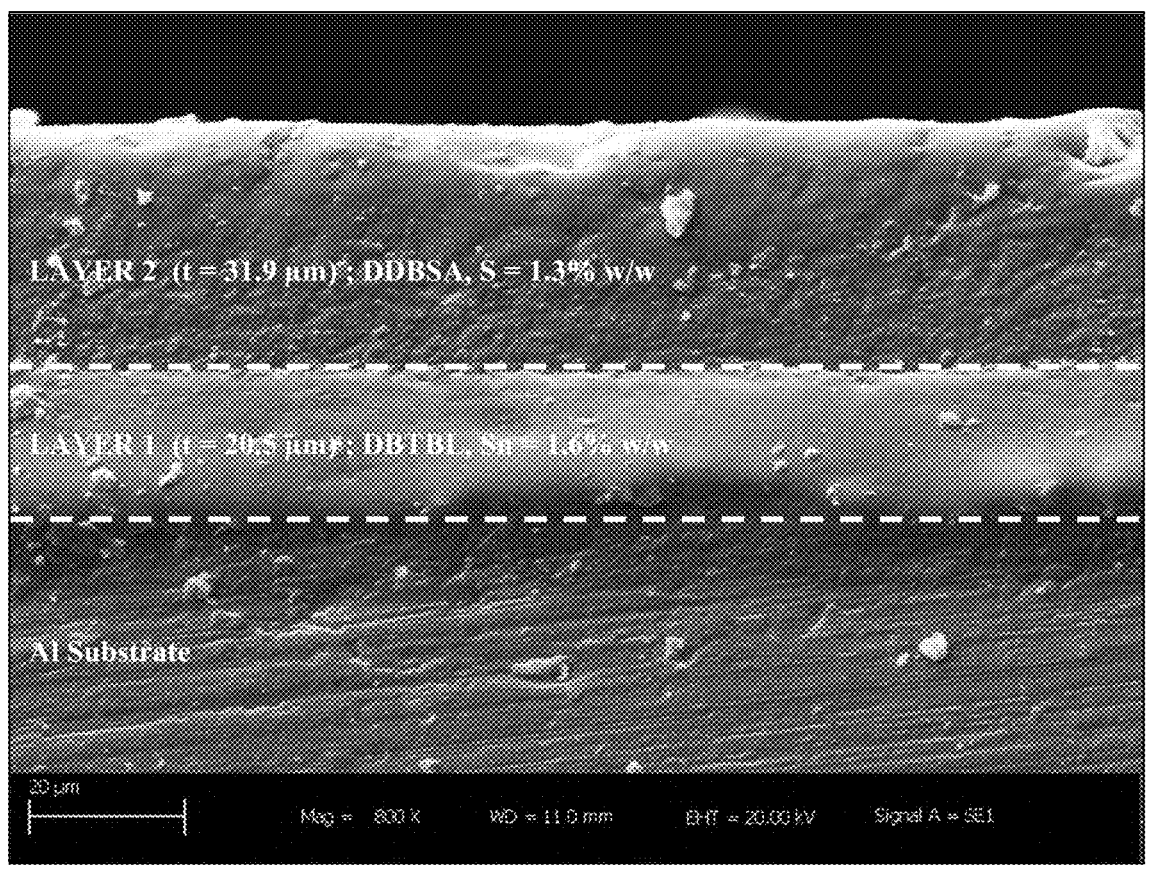
FIG. 3 shows a secondary electron micrograph of a cured double coating obtained by curing the double coating of Example 1.

The low temperature cure composite coating was cured at a temperature of 83.3° C. for 20 minutes, to provide a cured doublecoating, including: a clear first layer having a thickness of 20.5 μm and a urethane second layer (a clear topcoat) having a thickness of 31.9 μm. A secondary electron micrograph of the cured doublecoating on the aluminum substrate is shown in FIG. 3.

The cured doublecoating was analyzed with a Zeiss EVO® MA15 scanning electron microscope equipped with a tungsten thermionic source and an EDAX® Genesis XM-4 analyzer employing a Si—Li X-ray detector. The compositional results of the first layer are shown in Table 1:

TABLE 1

| Element | Weight % | Atomic % |
|---|---|---|
| C K | 80.21 | 84.4 |
| N K | 5.98 | 5.4 |
| O K | 12.31 | 9.73 |
| Al K | 0.51 | 0.24 |
| Si K | 0.06 | 0.03 |
| S K | 0.38 | 0.15 |
| Sn L | 0.54 | 0.06 |
| Total | 100 | 100 |

The compositional results of the second layer are shown in Table 2:

TABLE 2

| Element | Weight % | Atomic % |
|---|---|---|
| C K | 78.62 | 82.9 |
| N K | 7.37 | 6.66 |
| O K | 12.6 | 9.97 |
| Al K | 0.01 | 0.01 |
| Si K | 0.1 | 0.04 |
| S K | 0.96 | 0.38 |
| Sn L | 0.34 | 0.04 |
| Total | 100 | 100 |

Importantly, the first layer contains 0.38 percent by weight of sulfur and the second layer contains 0.96 percent by weight of sulfur. Aside from the qualitative result of the first layer and the second layer curing at a temperature of 83.3° C. without the necessary catalyst for the crosslinking reactions being included in each of their film-forming compositions, the compositional results confirm that the DDBSA that was originally only contained in the second layer migrated into the first layer. The atomic ratio of sulfur to carbon in the first layer is 0.0017 and the atomic ratio of sulfur to carbon in the second layer is 0.0046.

Although trace amounts of Sn were observed visually in the X-ray spectra of the first layer and the second layer in this example, the content of Sn detected in each of the first layer (0.6 atomic percent) and second layer (0.04 atomic percent) are technically below the detection limit at <0.1 atomic percent.

To further analyze the migration of the sulfur and tin in the cured double coating, laser ablation inductively coupled plasma mass spectrometry (ICP MS) depth profiling as well as laser ablation complimented with ex situ X-ray photoelectron spectroscopy (XPS) were carried out.

The laser ablation was performed with a CEM LSX-213 laser unit. The ablation size was 200 μm, and the laser parameters were tuned to achieve a sufficient number of data points. For instance, the laser parameters were adjusted to provide 21 ablation steps with a thickness of 2.5 μm per step for the ICP MS analysis.

The ICP MS was performed with a Perkin Elmer NexION 300D. The XPS was performed with Kratoz Axis Ultra.

Figure 4A:
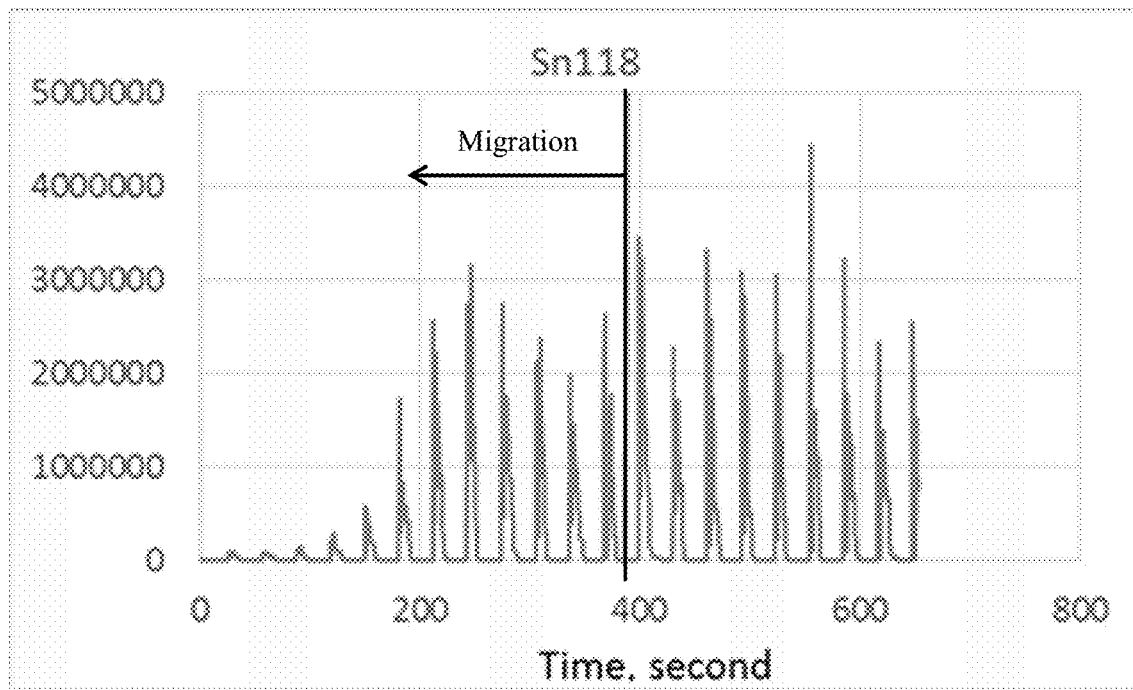
FIG. 4A shows a laser ablation inductively coupled plasma mass spectrometry (ICP MS) depth profile of $^{118}Sn$ in a cured double coating that includes a second layer and a first layer, where the migration of an organo tin catalyst from the first layer into the second layer is observed. The solid vertical line represents the interface between the second layer (left of line) and the first layer (right of line).
Figure 4B:
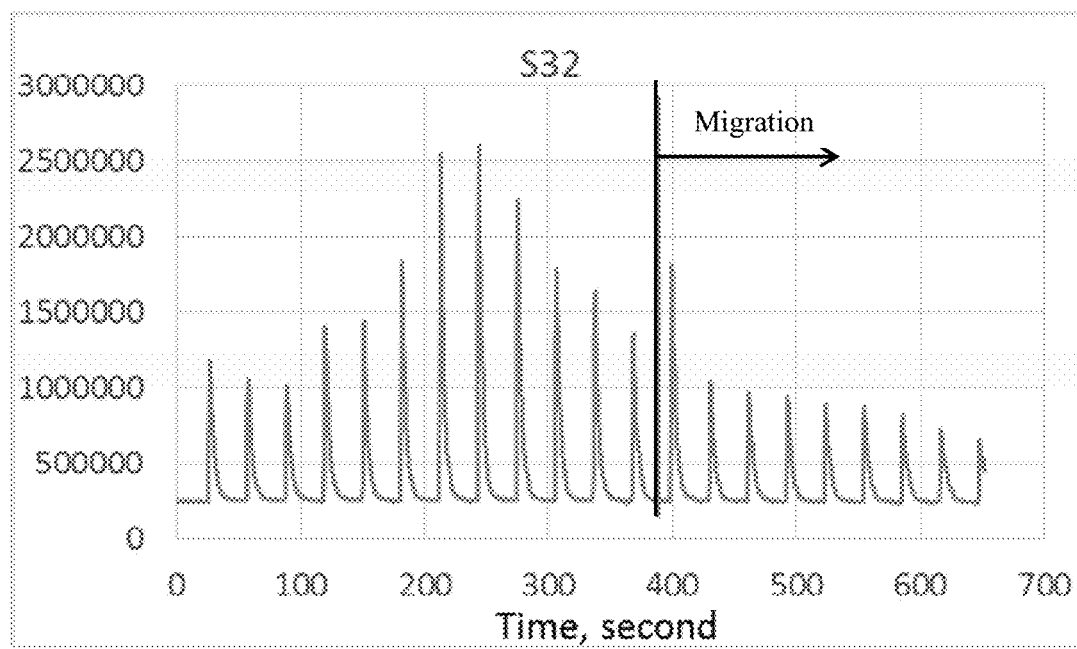
FIG. 4B shows a laser ablation ICP MS depth profile of $^{32}S$ in the cured double coating of FIG. 4A, where the migration of an unblocked sulfonic acid catalyst from the second layer into first layer is observed. The solid vertical line represents the interface between the second layer (left of line) and the first layer (right of line).

FIGS. 4A and 4B show the results of the laser ablation with ICP MS. In FIG. 4A, the migration of DBTDL from the first layer into the second layer is observed by monitoring the $^{118}$Sn signal through the cured doublecoating to the Al substrate, which was simultaneously monitored with the $^{27}$Al signal. $^{13}$C was also simultaneously monitored and is essentially constant through the cured doublecoating except for an increase in step 13, which is the first step beyond the first layer-second layer interface.

Based on the ablation step size of 2.5 µm, the DBTBL catalyst migrates around 15 µm into the second layer. Beyond 15 µm from the interface of the first layer and the second layer, the $^{117}$Sn signal drops rapidly towards the surface of the second layer.

In FIG. 4B, the migration of DDBSA from the second layer into the first layer is observed by monitoring the $^{32}$S signal through the cured doublecoating to the Al substrate. Based on the ablation step size of 2.5 µm, the DDBSA catalyst migrates around 20 µm into the first layer. Beyond 20 µm from the interface of the first layer and the second layer, the $^{32}$S signal drops gradually through the first layer towards the Al substrate.

Figure 5A:
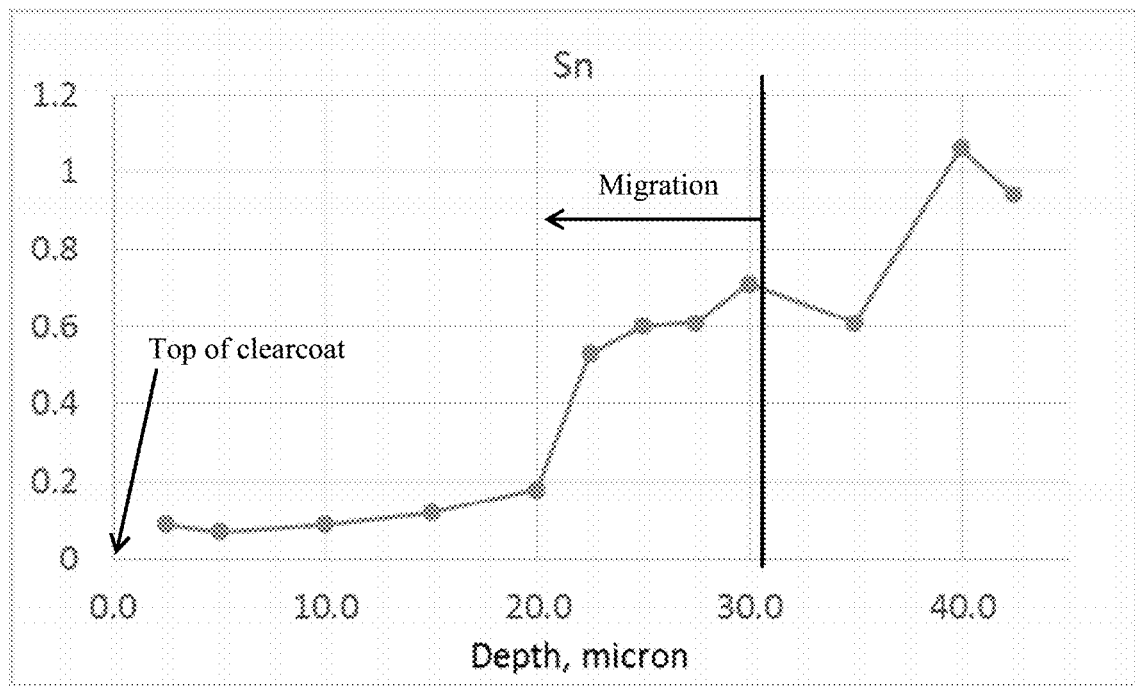
FIG. 5A shows a laser ablation and ex situ X-ray photoelectron spectroscopy (XPS) depth profile of Sn in a cured doublecoating that includes a second layer and a first layer, where the migration of an organo tin catalyst from the first layer into the second layer is observed. The solid vertical line represents the interface between the second layer (left of line) and the first layer (right of line).
Figure 5B:
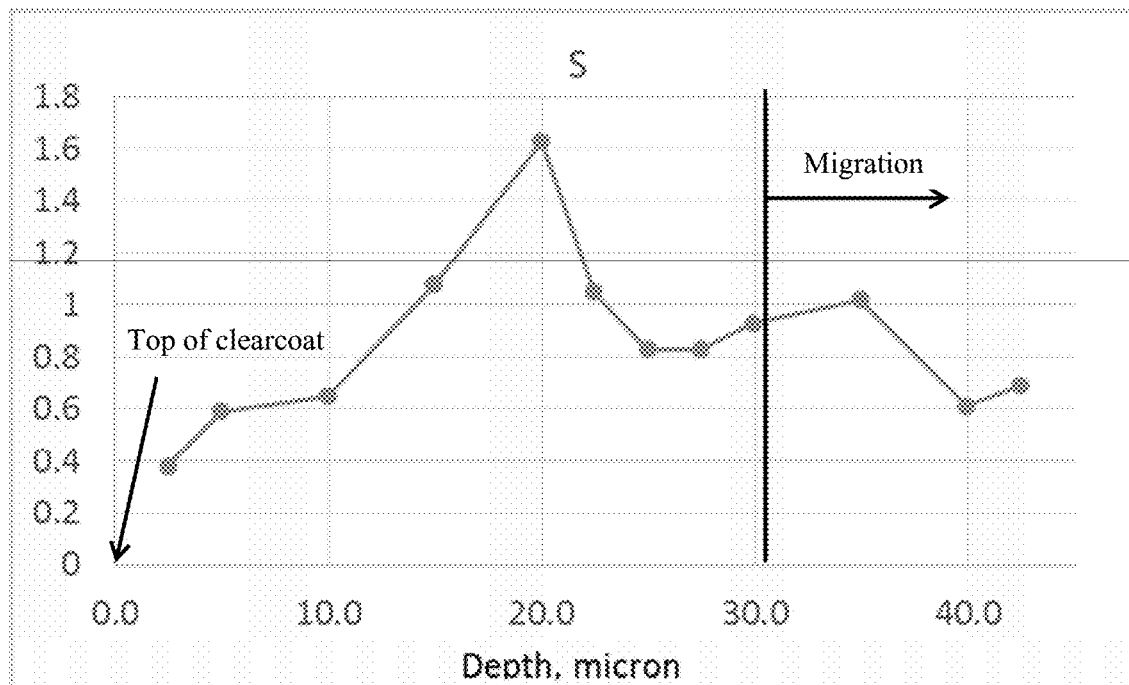
FIG. 5B shows a laser ablation and ex situ XPS depth profile of S in the cured double coating of FIG. 5A, where the migration of an unblocked sulfonic acid catalyst from the second layer into first layer is observed. The solid vertical line represents the interface between the second layer (left of line) and the first layer (right of line).

The laser ablation with ex situ XPS results are shown in FIGS. 5A and 5B. FIG. 5A shows the migration of DBTDL from the first layer into the second layer based on the Sn-3d XPS signal through the cured double coating to the Al substrate. According to FIG. 5A, the DBTBL catalyst migrates around 12.5 µm into the second layer. Beyond 115 µm from the interface of the first layer and the second layer, the Sn-3d signal drops rapidly towards the surface of the second layer.

In FIG. 5B, the migration of DDBSA from the second layer into the first layer is observed by monitoring the S-2p signal through the cured double coating to the Al substrate. The DDBSA catalyst migrates around 15 to 20 µm into the first layer. Beyond 15 to 20 µm from the interface of the first layer and the second layer, the S-2p signal drops gradually through the first layer towards the Al substrate.

Example 2

A second low temperature cure composite coating was prepared by in the same manner as Example 1 except that the first layer was pigmented by the addition of 410.9 grains of Cabot Black Pearls 1300.

A low temperature cure composite coating was prepared by: depositing the pigmented waterborne first layer composition on an aluminum substrate; drying the first layer for 10 minutes at 43.3° C.; and depositing, on the partially dried first layer, the solventborne second layer composition.

Figure 6:
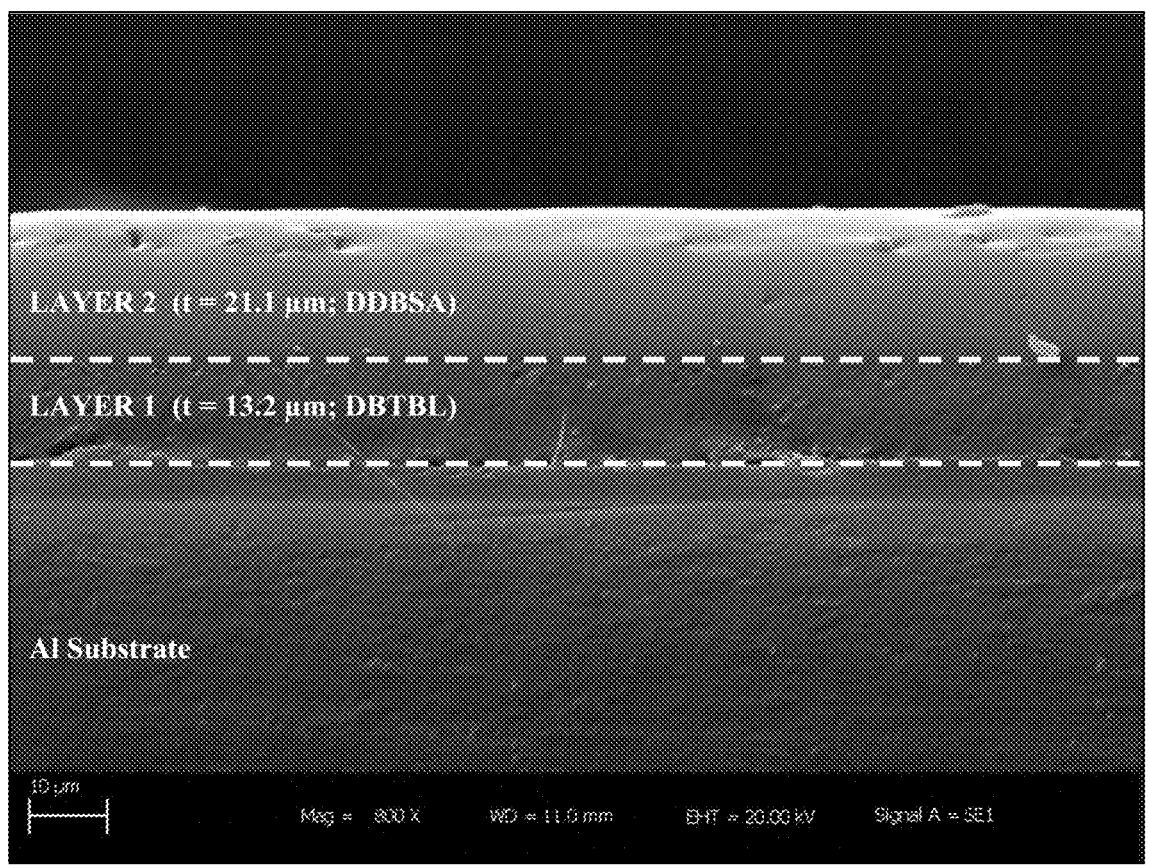
FIG. 6 shows a secondary electron micrograph of a cured doublecoating obtained by curing the double coating of Example 2.

The low temperature cure composite coating was cured at a temperature of 83.3° C. for 20 minutes, to provide a cured double coating, including: a pigmented first layer having a thickness of 13.2 µm and a urethane second layer (a clear topcoat) having a thickness of 21.1 µm. A secondary electron micrograph of the cured double coating on the aluminum substrate is shown in FIG. 6.

The cured double coating was analyzed in the same manner as Example 1. The compositional results of the first layer are shown in Table 3:

TABLE 3

| Element | Weight % | Atomic % |
|---------|----------|----------|
| C K | 87.01 | 90.42 |
| N K | 3.13 | 2.79 |
| O K | 7.9 | 6.16 |
| Al K | 0.15 | 0.07 |
| Si K | 0.13 | 0.06 |
| S K | 1.12 | 0.44 |
| Sn L | 0.55 | 0.06 |
| Total | 100 | 100 |

The compositional results of the second layer are shown in Table 4:

TABLE 4

| Element | Weight % | Atomic % |
|---------|----------|----------|
| C K | 80.71 | 84.66 |
| N K | 6.64 | 5.97 |
| O K | 11.01 | 8.67 |
| Al K | 0.57 | 0.26 |
| Si K | 0.13 | 0.06 |
| S K | 0.95 | 0.37 |
| Total | 100 | 100 |

Importantly, the first layer contains 1.12 percent by weight of sulfur and the second layer contains 0.95 percent by weight of sulfur. Again, the compositional results confirm that the DDBSA that was originally only contained in the second layer migrated into the first layer. The atomic ratio of sulfur to carbon in the first layer is 0.0049 and the atomic ratio of sulfur to carbon in the second layer is 0.0044.

Although trace amounts of Sn were observed visually in the X-ray spectra of the first layer, which originally contained the DBTDL, the content of Sn detected in the first layer is technically below the detection limit at <0.1 atomic percent. No Sn was detected in the second layer.

Due to the pigmentation, the cured double coating of Example 2 was not suitable for depth profiling.

Numerous modifications and variations of the present invention are possible in light of the above teachings. It is therefore to be understood that within the scope of the appended claims, the invention may be practiced otherwise than as specifically described herein.

What is claimed is:

1. A double coating, comprising:
 a substrate;
 a first layer comprising a first low-temperature cure coating composition, which comprises
  a first hydroxy-functional resin,
  an aminoplast resin low-temperature crosslinking agent, and
  a first catalyst;
 and
 a second layer comprising a second low-temperature cure coating composition, which is a solventborne composition comprising
  a second hydroxy-functional resin, which is a low hydrophilicity acrylic resin,
  a second low-temperature crosslinking agent, which is an isocyanate resin,
  a second catalyst, and
  an organic solvent,
 wherein the first layer and the second layer are adjacent to each other,
 wherein the first catalyst catalyzes a crosslinking reaction between the second hydroxy-functional resin and the second low-temperature crosslinking agent, and does not catalyze a crosslinking reaction between the first hydroxy-functional resin and the aminoplast resin low-temperature crosslinking agent,
 wherein the second catalyst catalyzes a crosslinking reaction between the first hydroxy-functional resin and the aminoplast resin low-temperature crosslinking agent, and does not catalyze a crosslinking reaction between the second hydroxy-functional resin and the second low-temperature crosslinking agent.

2. The coating of claim 1, wherein the first and second low-temperature cure coating compositions cure within 20 minutes at a temperature of 100° C.

3. The coating of claim 1, wherein the low hydrophilicity acrylic resin as the second hydroxy-functional resin comprises, in polymerized form, at least one alkyl (meth)acrylate monomer.

4. The coating of claim 1, wherein the low hydrophilicity acrylic resin as the second hydroxy-functional resin comprises, in polymerized form, at least one unsubstituted alkyl (meth)acrylate monomer in a content of at least 25 mol % with respect to total monomers in the low hydrophilicity acrylic resin.

5. The coating of claim 1 wherein the low hydrophilicity acrylic resin as the second hydroxy-functional resin comprises, in polymerized form, at least one cycloalkyl (meth)acrylate monomer in a content of at most 75 mol % with respect to total monomers in the low hydrophilicity acrylic resin.

6. The coating of claim 1, wherein the low hydrophilicity acrylic resin as the second hydroxy-functional resin comprises, in polymerized form, at least one hydroxy-substituted alkyl (meth)acrylate monomer in a content of at most 75 mol % with respect to total monomers in the low hydrophilicity acrylic resin.

7. The coating of claim 1, wherein the low hydrophilicity acrylic resin as the second hydroxy-functional resin comprises, in polymerized form with respect to total monomers in the low hydrophilicity acrylic resin:
   at least one unsubstituted alkyl (meth)acrylate monomer in a content of from 25 mol % to 100 mol %,
   optionally, a hydroxy-substituted alkyl (meth)acrylate monomer, if present, in a content of from 0 to 75 mol %,
   optionally, a (meth)acrylic acid monomer, if present, in a content of from 0 to 25 mol %, and
   optionally, a cycloalkyl (meth)acrylate monomer, if present, in a content of from 0 to 75 mol %.

8. The coating of claim 7, wherein the low hydrophilicity acrylic resin as the second hydroxy-functional resin further comprises, in polymerized form, a substituted alkyl (meth)acrylate monomer comprising a substituent that is not a hydroxyl group.

9. The coating of claim 1, wherein each of the first and second layers has a stable pot life of at least 30 days.

10. The coating of claim 1, wherein the second layer is a non-polar clearcoat and the first layer comprises water.

11. The coating of claim 1, wherein the substrate comprises, as at least one thermoplastic material, a polyolefin, a polyamide, a polyurethane, a polyester, a polycarbonate, an acrylonitrile-butadiene-styrene (ABS) copolymer, an EPDM rubber, an acrylic polymer, or a vinyl polymer.

12. The coating of claim 1, wherein the first low-temperature cure coating composition comprises, based on a total weight of resin solids in the composition:
   from 35 to 65 percent by weight of the first hydroxy-functional resin:
   from 15 to 65 percent by weight of the aminoplast resin low-temperature crosslinking agent; and
   from 0.05 to 7.5 percent by weight of the first catalyst, and
   wherein the second low-temperature cure coating composition comprises, based on a total weight of resin solids in the composition:
   from 35 to 65 percent by weight of the second hydroxy-functional resin:
   from 35 to 65 percent by weight of the second low-temperature crosslinking agent; and
   from 0.25 to 7.5 percent by weight of the second catalyst.

13. A method of curing the coating of claim 1, the method comprising curing the coating at a temperature of from 80° C. to less than 120° C.

14. A method of coating a substrate by curing the double coating of claim 1, the method comprising:
   depositing the first layer on the substrate,
   depositing the second layer directly on the first layer, thereby obtaining the double coating, and
   curing the double coating at a temperature of from 80° C. to less than 120° C., thereby obtaining a cured double coating.

15. The method of claim 14, wherein an amount of the second catalyst in the first layer after the curing is greater than 50% by mass of an initial amount of the second catalyst in the second layer immediately after the second layer is deposited, and
   an amount of the first catalyst in the second layer after the curing is greater than 50% by mass of an initial amount of the first catalyst in the first layer immediately after the first layer is deposited.

* * * * *